(12) United States Patent
Bartusiak et al.

(10) Patent No.: US 8,530,021 B2
(45) Date of Patent: Sep. 10, 2013

(54) MICROSTRUCTURED TAPE

(75) Inventors: Joseph T. Bartusiak, Osseo, MN (US); Graham M. Clarke, Woodbury, MN (US)

(73) Assignee: 3M Innovative Properties Company, St. Paul ( * ) Notice: Subject to any disclaimer, the term of this patent is extended or adjusted under 35 U.S.C. 154(b) by 224 days.

(21) Appl. No.: 13/042,536

(22) Filed: Mar. 8, 2011

(65) Prior Publication Data

US 2012/0231199 A1      Sep. 13, 2012

(51) Int. Cl.
*B32B 33/00*     (2006.01)
*B32B 7/12*      (2006.01)
*B32B 3/30*      (2006.01)

(52) U.S. Cl.
USPC ............. 428/40.1; 428/42.1; 428/43; 428/98; 428/167; 428/343; 428/354

(58) Field of Classification Search
USPC ................... 428/40.1, 42.1, 43, 98, 156, 167, 428/343, 354
See application file for complete search history.

(56) References Cited

U.S. PATENT DOCUMENTS

| | | | |
|---|---|---|---|
| 4,781,957 A | 11/1988 | Brown | |
| 6,432,527 B1 * | 8/2002 | Perez et al. | 428/343 |
| 6,524,675 B1 | 2/2003 | Mikami | |
| 6,649,249 B1 | 11/2003 | Engle | |
| 7,105,809 B2 | 9/2006 | Wood | |
| 2003/0129301 A1 | 7/2003 | Engle | |
| 2003/0235677 A1 | 12/2003 | Hanschen | |
| 2004/0001931 A1 | 1/2004 | Izzi | |
| 2005/0058829 A1 | 3/2005 | Ukei | |
| 2007/0015288 A1 | 1/2007 | Hulteen | |

FOREIGN PATENT DOCUMENTS

| | | |
|---|---|---|
| EP | 0 373 646 | 3/1995 |
| EP | 1 516 898 | 3/2005 |
| WO | WO 99/55537 | 11/1999 |

OTHER PUBLICATIONS

International Search Report, PCT/US2012/025811, mailed Dec. 28, 2012, 4 pages.
Encyclopedia of Polymer Science and Engineering, Fibers, Optical to Hydrogenation: *Films, Manufacture*, vol. 7, 1987, 10 pages.

* cited by examiner

*Primary Examiner* — Patricia Nordmeyer
(74) *Attorney, Agent, or Firm* — Kenneth B. Wood

(57) ABSTRACT

Herein is disclosed a plastic tape, comprising a backing with a first major side comprising a microstructured paint-retention pattern and a second major side that may comprise a microstructured hand-tear pattern and with a pressure-sensitive adhesive layer disposed on second major side of the backing; wherein the backing, the microstructured paint-retention pattern, and the microstructured hand-tear pattern (if present) all constitute a monolithic plastic unit.

23 Claims, 10 Drawing Sheets

MICROSTRUCTURED TAPE

BACKGROUND

Masking tapes have been used for some time in the painting of surfaces. Masking tapes are often comprised of creped paper with a pressure-sensitive adhesive on one surface.

SUMMARY

Herein is disclosed a plastic tape, comprising a backing with a first major side comprising a microstructured paint-retention pattern and a second major side that may comprise a microstructured hand-tear pattern and with a pressure-sensitive adhesive layer disposed on second major side of the backing; wherein the backing, the microstructured paint-retention pattern, and the microstructured hand-tear pattern (if present) all constitute a monolithic plastic unit.

In one aspect, herein is disclosed a hand-tearable plastic tape, comprising; a backing comprising a longitudinal axis and a transverse width and axis, and comprising a first major side and an oppositely-facing second major side, wherein the first major side of the backing comprises a microstructured paint-retention pattern comprising microreceptacles that are at least partially defined by a multiplicity of first microstructured partitions and a multiplicity of second microstructured partitions at least some of which intersect with first microstructured partitions to define microreceptacles thereby; wherein the second major side of the backing comprises a microstructured hand-tear pattern comprising a multiplicity of lines of weakness at least some of which comprise a long axis that is oriented at least generally transversely to the backing; wherein a pressure-sensitive adhesive is disposed on the second major side of the backing; and wherein the backing, the microstructured paint-retention pattern and the microstructured hand-tear pattern all constitute a monolithic plastic unit.

In another aspect, herein is disclosed a method of painting a first surface portion while masking a second surface portion so that it is not painted, the method comprising: adhesively attaching a length of hand-tearable plastic tape to the second surface portion, the hand-tearable plastic tape comprising a backing comprising a longitudinal axis and a transverse width and axis, and comprising a first major side and an oppositely-facing second major side, wherein the first major side of the backing comprises a microstructured paint-retention pattern, wherein the second major side of the backing comprises a microstructured hand-tear pattern, wherein a pressure-sensitive adhesive is disposed on the second major side of the backing, and wherein the backing, the microstructured paint-retention pattern and the microstructured hand-tear pattern all constitute a monolithic plastic unit; and, applying liquid paint to at least the first surface portion.

In another aspect, herein is disclosed a method of making a hand-tearable plastic tape comprising a backing with a first major side with a microstructured paint-retention pattern, and a second, oppositely-facing major side with a microstructured hand-tear pattern, the method comprising: contacting a first major surface of a molten polymeric extrudate with a first tooling surface that comprises a negative of the microstructured paint-retention pattern, and contacting a second major surface of the molten polymeric extrudate with a second tooling surface that comprises a negative of the microstructured hand-tear pattern, so that the first major surface of the extrudate is molded against the first tool and the second major surface of the extrudate is molded against the second tool, so as to form a backing with a microstructured paint-retention pattern on the first major side of the backing and a microstructured hand-tear pattern on the second major side of the backing; and, disposing a pressure-sensitive adhesive on the second major side of the backing.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "up" and "down", and "first" and "second" may be used in this disclosure, it should be understood that those terms are used in their relative sense only unless otherwise noted. The terms outward and inward refer to directions generally away from the interior of backing 2 of tape 1, and toward the interior of backing 2 of tape 1, respectively.

DETAILED DESCRIPTION

Figure 1:
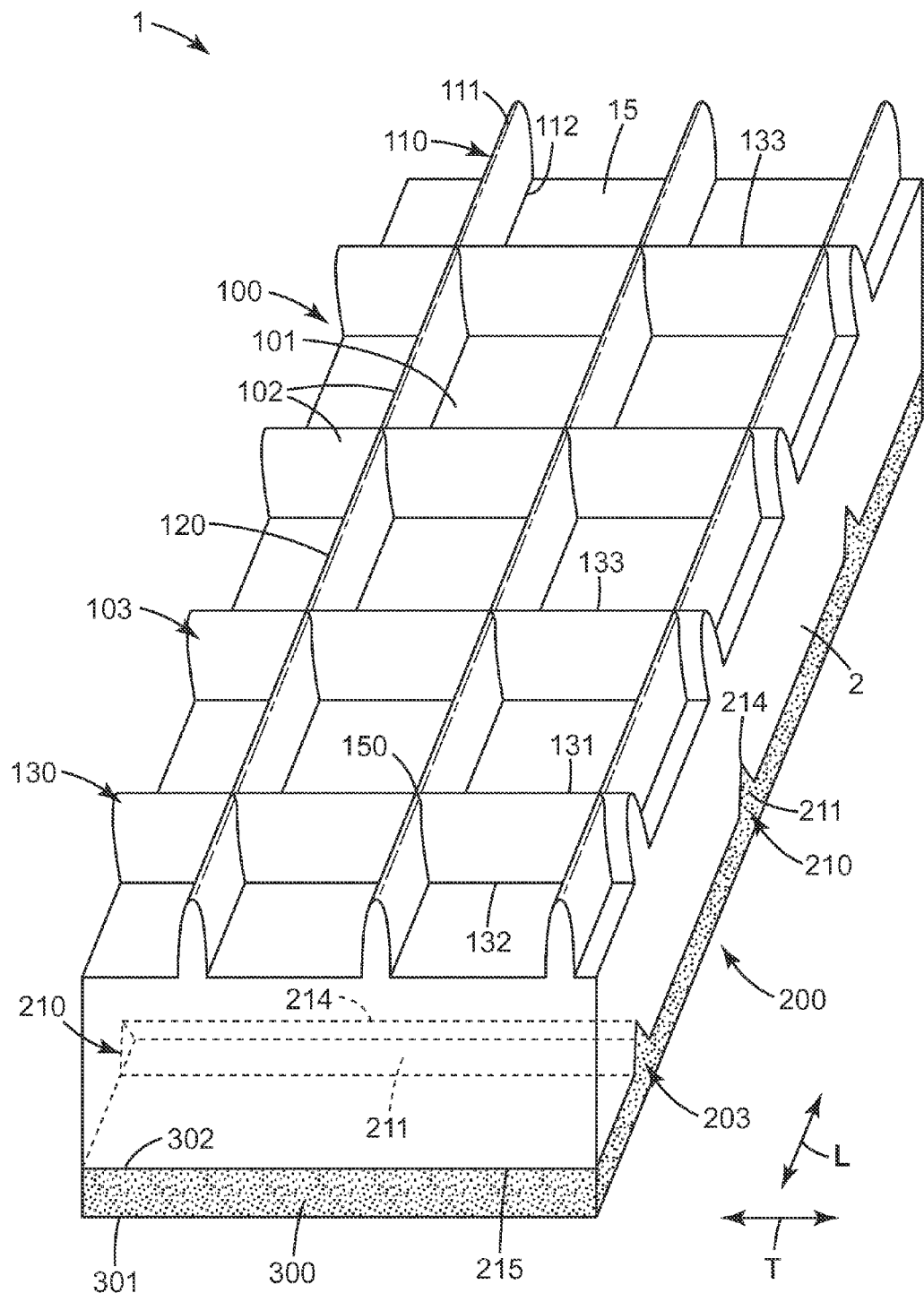
FIG. 1 is a perspective view, from the first major side, of a portion of an exemplary microstructured tape.
Figure 2:
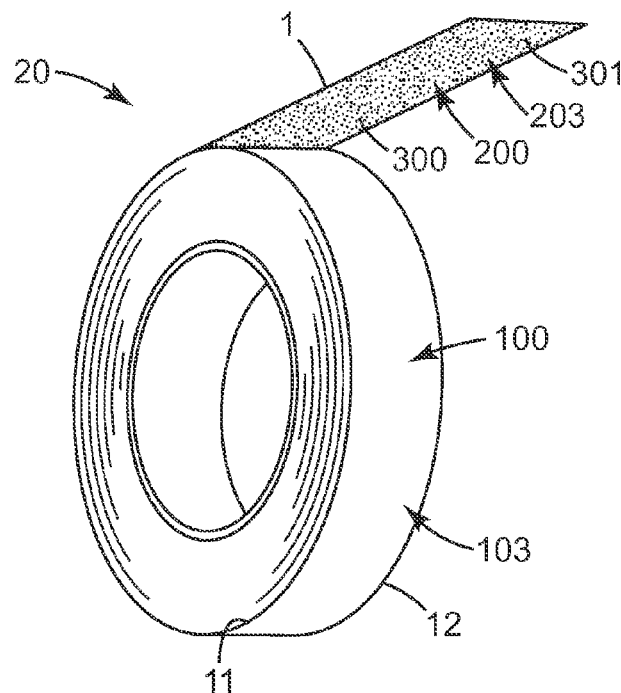
FIG. 2 is a perspective view of an length of exemplary microstructured tape, in the form of a roll.
Figure 3:
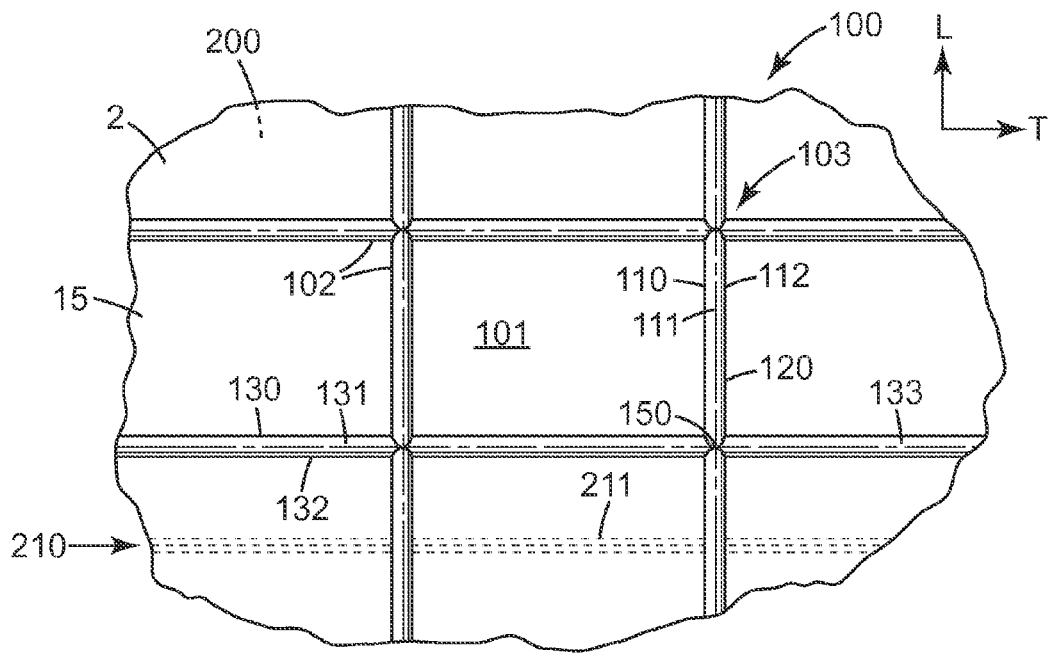
FIG. 3 is a plan view of a portion of the first major side of the backing of the exemplary microstructured tape of FIG. 1.
Figure 4:
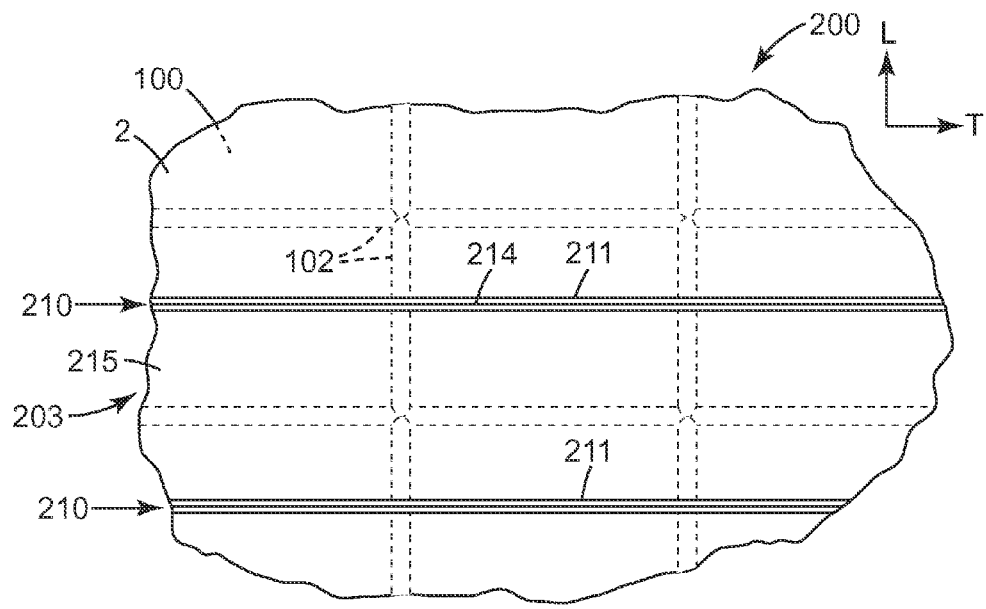
FIG. 4 is a plan view of a portion of the second major side of the backing of the exemplary microstructured tape of FIG. 1.

Shown in FIG. 1 is a perspective view, from the first major side, of a portion of an exemplary microstructured tape 1 comprising a backing 2. Shown in FIG. 2 is a perspective view of microstructured tape 1 in the form of a roll 20. FIGS. 3 and 4 contain plan views of the first and second major sides of backing 2, respectively. (In these and all other figures in which they appear, the term "T" designates the transverse axis, and the term "L" designates the longitudinal axis, of tape 1 and backing 2 thereof.) Tape 1 and backing 2 thereof comprise a longitudinal axis and length, a transverse axis and width and minor transverse edges 11 and 12 (i.e., e.g., as seen in FIG. 2), and a thickness. As shown in FIGS. 1 and 3, backing 2 comprises first major side 100 that comprises a microstructured paint-retention pattern 103. As shown in FIGS. 1 and 4, backing 2 comprises second major side 200 that may comprise a microstructured hand-tear pattern 203. As shown in FIGS. 1 and 2, pressure-sensitive adhesive 300 is disposed on second major side 200 of backing 2, e.g. with second major adhesive surface 302 of pressure-sensitive adhesive 300 in contact with, and adhesively adhered to, second major surface 215 of backing 2. As shown in FIG. 2, microstructured tape 1 may be conveniently provided in an elongate length in the form of a roll, e.g. a self-wound roll without a release liner, from which a length of tape 1 may be removed by hand-tearing (although other methods involving scissors or other cutting implements may be used if desired). First major adhesive surface 301 of pressure-sensitive adhesive may then be used to adhere the length of tape 1 to a surface portion that is desired to be masked. An adjacent surface portion may then be painted without paint penetrating onto the masked surface portion.

By microstructured hand-tear pattern 203 is meant a multiplicity of lines of weakness 210 (as shown in exemplary manner in FIGS. 1 and 4) that are present on second major side 200 of backing 2 and that comprise a long axis that is oriented at least generally transversely to backing 2 and that extend generally across the width of backing 2, and that are spaced along the longitudinal axis of backing 2. Lines of weakness 210 may enhance the ability of backing 2 of tape 1 to be hand-torn at least generally transversely across its width so as to remove a length of backing 2 and tape 1 from a larger length (e.g., from a roll). By at least generally transversely (as used here and elsewhere herein) it is not meant that lines of weakness 210 must necessarily be oriented in strict alignment with the transverse axis of backing 2 (e.g., in the specific manner shown in FIGS. 1-3), but rather encompasses any design in which lines of weakness 210 are at any orientation within plus or minus about 45 degrees of the transverse axis of backing 2. In further embodiments, lines of weakness 210 (i.e., a long axis thereof) may be oriented within plus or minus about 30 degrees, plus or minus about 20 degrees, or plus or minus about 10 degrees, of the transverse axis of backing 2. In a specific embodiment, lines of weakness 210 may be oriented in strict alignment with the transverse axis of backing 2, meaning that they are oriented within plus or minus about 5 degrees of the transverse axis of backing 2.

Each individual line of weakness 210 may be a continuous line of weakness that is provided by a recess, or may be a discontinuous line of weakness that is provided collectively by a multiplicity of recesses. By a recess is meant a feature at least some of whose surface(s) are recessed below (i.e., inward toward the interior of backing 2) major surface 215 (which may be, but is not necessarily, a generally flat plano surface) of second major side 200 of backing 2, so as to comprise an open-ended, outward-facing cavity (e.g., a depression, divot, notch, trench, groove, furrow, hole, etc.). Recesses as defined herein do not encompass interior cavities, voids, pores or the like as might be present in some materials (e.g., microporous materials, foams and the like), nor do they encompass such pores as might be present on the surface of open-celled foams and the like. By microstructured hand-tear pattern is further meant that the recesses that provide lines of weakness 210 comprise predetermined, molded structures (e.g., as obtained by molding a polymeric thermoplastic resin against a tooling surface that comprises the negative of the recesses desired to be provided on second major side 200 of backing 2) with dimensions ranging from about 5 to about 200 microns in at least two orthogonal directions. One of these orthogonal directions is normal to the plane of backing 2 thus this dimension comprises the recess depth. By way of example, for a line of weakness 210 that is provided by a recess comprised of an elongate groove 211 as shown in FIGS. 1 and 4, the recess depth is the distance that the deepest (inwardmost) point 214 of groove 211 is spaced inward from second major surface 215 of backing 2, along an axis normal to the major plane of backing 2. Often, the lateral width of groove 211 (lateral meaning in a direction across the width of the groove, which direction may often be generally aligned with the longitudinal axis of backing 2) may comprise the second, orthogonal direction. Thus, if the depth of groove 211 and the lateral width of groove 211 are both in between about 5 and about 200 microns at any location along the length of groove 211, groove 211 is by definition a microstructured feature irrespective of the fact that it may have an extremely long length. In some embodiments, the recesses that provide lines of weakness 210 are present in regular, predictable, repeating patterns.

Figure 5:
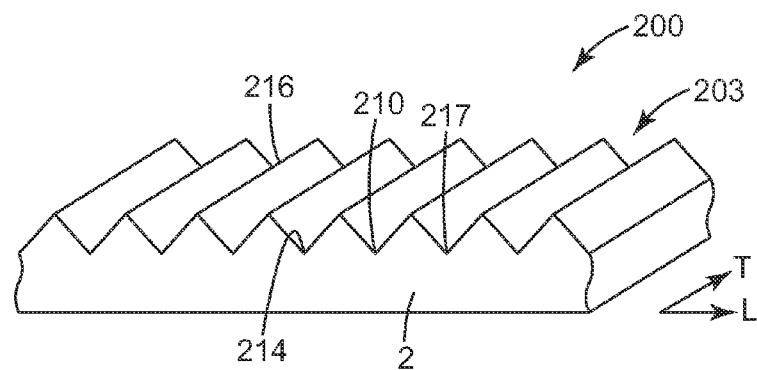
FIG. 5 is a perspective view of a portion of the second major side of the backing of another exemplary microstructured tape.
Figure 6:
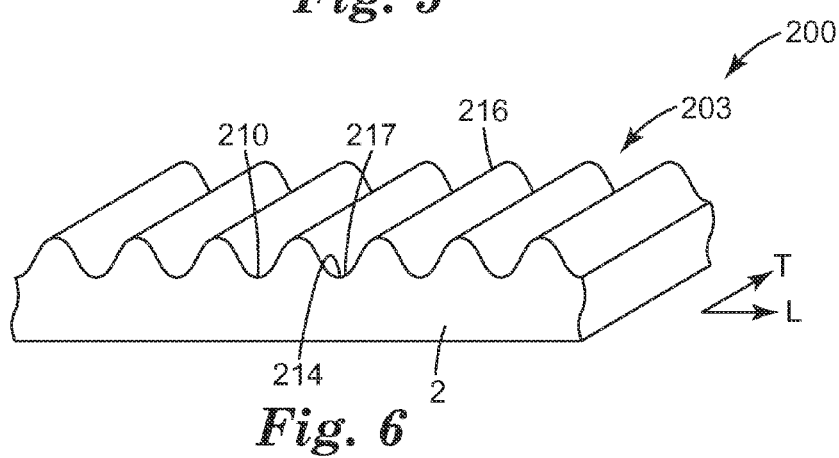
FIG. 6 is a perspective view of a portion of the second major side of the backing of another exemplary microstructured tape
Figure 7:
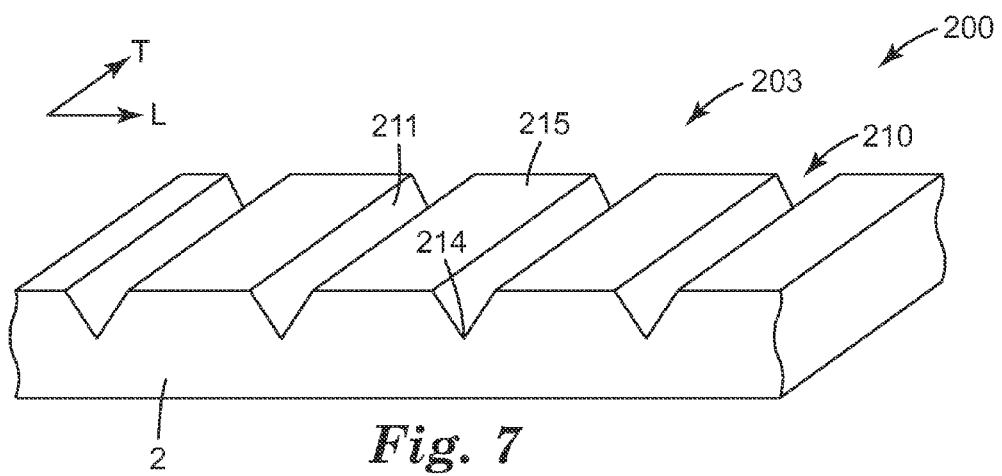
FIG. 7 is a perspective view of a portion of the second major side of the backing of the exemplary microstructured tape of FIG. 1.

The presence of a line of weakness 210 as provided by one or more recesses does not imply that a discernible flat (plano) surface must necessarily be present on second major side 200 of backing 2. Rather, in some embodiments second major side 200 may comprise a hand-tear pattern 203 that, for example, comprises lines of weakness 210 in the form of grooves (valleys) 217 interspersed between ridges 216, e.g. as shown in the exemplary embodiments of FIGS. 5 and 6. In such cases, valleys 217 comprise recesses, and for purposes of determining whether a given valley is microstructured, its depth can be considered to be the distance (measured normal to the plane of backing 2) from the outwardmost tip of ridge 216 to the inwardmost (deepest) point 214 of valley 217, and its width can be considered to be the distance (measured parallel to the plane of backing 2) from a tip of a ridge 216 to the tip of an adjacent ridge 216. Thus, if such distances fall in the range of about 5 microns to about 200 microns, such features comprise microstructured recesses as defined herein. Furthermore, ridges 216 and valleys 217 do not necessarily have to have sharp peaks and floors, respectively. Rather, either or both can be rounded, as in the exemplary embodiment of FIG. 6, or can have flat valley floors and/or ridge tops, etc. In summary, any microstructured pattern with an undulating (e.g. fluted, corrugated, etc.) surface that provides at least generally transversely-oriented lines of weakness 210 can be utilized.

In some embodiments, a recess that provides a continuous line of weakness 210 may comprise a continuous elongate groove 211 that extends continuously from one minor edge 11 of backing 2 to other minor edge 12 of backing 2. In various embodiments, the depth of groove 211 may be at least about 10 microns, at least about 15 microns, or at least about 20 microns. In further embodiments, the depth of groove 211 may be at most about 60 microns, at most about 50 microns, or at most about 40 microns. In various embodiments, the width of groove 211 may be at least about 20 microns, at least about 40 microns, or at least about 60 microns. In further embodiments, the width of groove 211 may be at most about 140 microns, at most about 120 microns, or at most about 100 microns. The width of groove 211 may be constant along the length of groove 211, or it may vary along the length. In various embodiments, the center-to-center spacing between grooves 211 (in the longitudinal direction down backing 2) may be at least about 0.40 mm, at least about 0.60 mm, or at least about 0.80 mm. In further embodiments, the spacing of grooves 211 may be at most about 1.4 mm, at most about 1.2 mm, or at most about 1.0 mm. The spacing between grooves 211 may be constant down the length of backing 2, or may vary. Grooves 211 may be interspersed (in the longitudinal direction down backing 2) by generally flat portions of surface 215 (as in FIGS. 1 and 3) or by outwardly-protruding ridges 216, or both, and/or by any other features.

Figure 8:
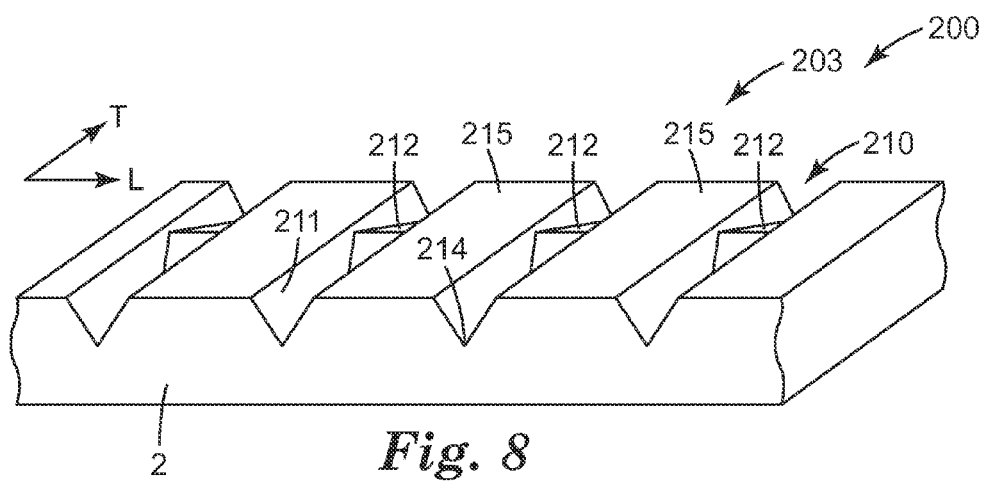
FIG. 8 is a perspective view of a portion of the second major side of the backing of another exemplary microstructured tape.
Figure 9:
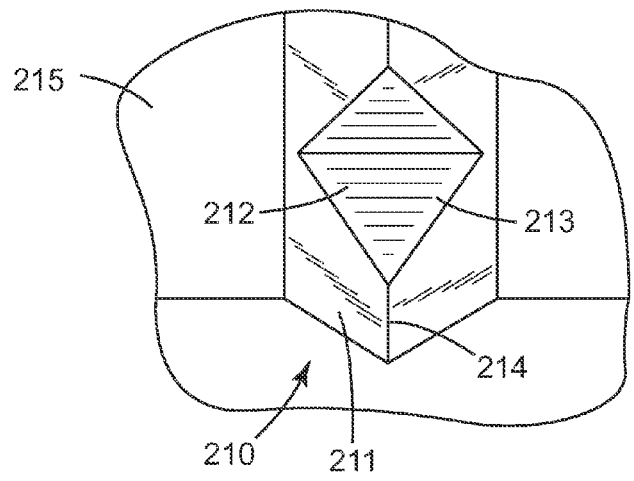
FIG. 9 is a perspective enlarged view of a portion of the second major side of the backing of FIG. 8.
Figure 10:
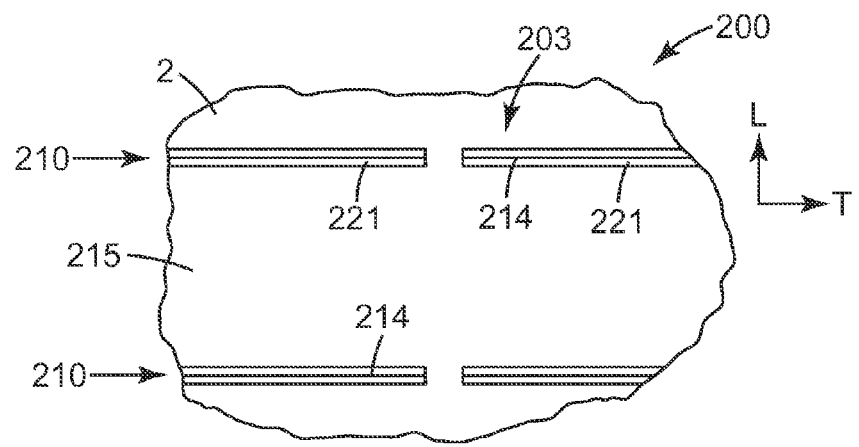
FIG. 10 is a plan view of a portion of the second major side of another exemplary microstructured tape.
Figure 11:
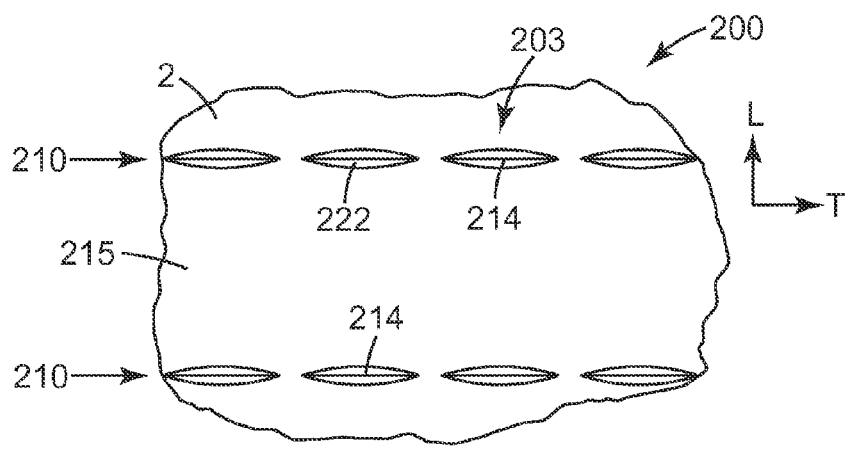
FIG. 11 is a plan view of a portion of the second major side of the backing of another exemplary microstructured tape.
Figure 12:
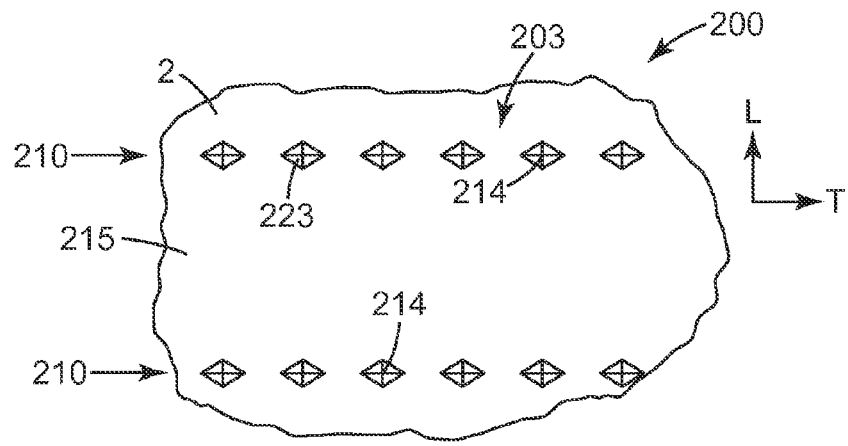
FIG. 12 is a plan view of a portion of the second major side of the backing of another exemplary microstructured tape.
Figure 13:
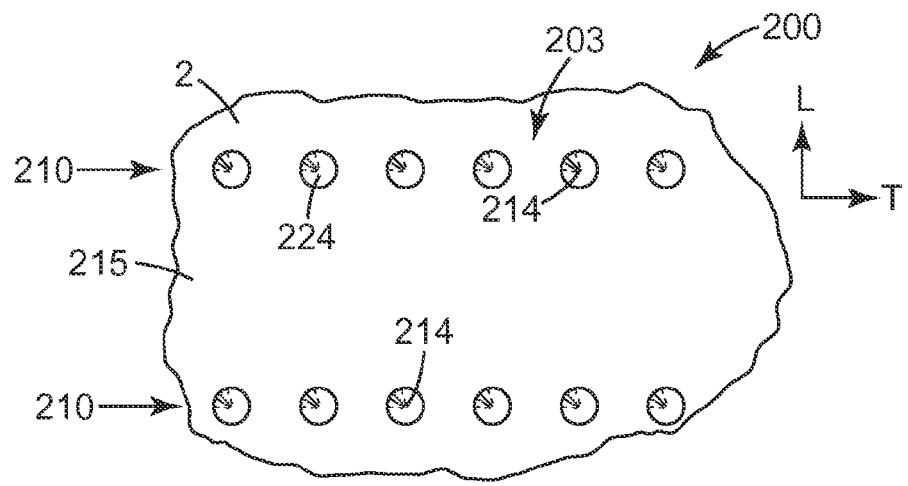
FIG. 13 is a plan view of a portion of the second major side of the backing of another exemplary microstructured tape.

Grooves 211 may comprise optional features if desired, such as bridging structures 212 as shown in FIGS. 8 and 9. (In the perspective views of FIGS. 5-9, and in the plan views of FIGS. 4 and 10-13, the first major side of backing 2 and the paint retention pattern thereof, as well as pressure-sensitive adhesive 300, are omitted for clarity of presentation). Such bridging structures, which are integrally molded with handtear pattern 203 and backing 2, may be spaced periodically down the length of groove 211, and may extend across at least a portion of the lateral width of groove 211 (e.g., in a direction generally aligned with the longitudinal axis of backing 2). Such bridging structures may e.g. enhance the longitudinal strength of backing 2 without unacceptably reducing the ability of grooves 211 to perform as lines of weakness 210. In a particular embodiment of this general type, bridging structure 212 may be designed as illustrated in FIG. 8 and shown in magnified view in FIG. 9. In such designs, bridging structure 212 may comprise two major sloping surfaces 213 that meet at a topmost ridge that is oriented substantially laterally across the width of groove 211. However, bridging structure 212 may have any suitable design (e.g., with a generally flat outward-facing (top) surface, with a rounded top surface, etc).

In some embodiments, lines of weakness 210 may be discontinuous, that is, provided not by a single recess but rather by a multiplicity of (e.g., two or more) recesses, spaced along a long axis (which may be, but does not necessarily have to be, a generally linear or strictly linear path) of discontinuous line of weakness 210 is that oriented at least generally transversely to backing 2, and acting in combination. In a specific example exemplified in FIG. 10, discontinuous grooves 221 may be provided that are interrupted by gaps (e.g., bearing plano surface 215) and that thus do not extend continuously across the entire width of backing 2. In a modification of this approach shown in FIG. 11, a discontinuous line of weakness 210 is provided collectively by a multiplicity of elongate oval recesses 222 that are aligned generally linearly across the transverse width of backing 2, each oval recess comprising a long axis that is generally oriented across the transverse width of backing 2. In a slight modification of this approach shown in FIG. 12, recesses 223 comprise diamond-shaped recesses aligned generally linearly across the transverse width of backing 2, each diamond-shaped recess comprising a long axis that is generally oriented across the transverse width of backing 2. It should be noted that such approaches do not necessarily require that individual recesses comprise a long axis that is generally oriented across the transverse width of backing 2, however. Thus, in the exemplary embodiment of FIG. 13, lines of weakness 210 are collectively provided by rows of generally circular recesses 224. (In FIG. 13 and in FIGS. 7-12, the deepest-inward point of a recess is designated by the reference number 214).

In any of these embodiments comprising discontinuous lines of weakness comprises of a multiplicity of recesses, the depth of a recess may be at least about 10 microns, at least about 15 microns, or at least about 20 microns. In further embodiments, the recess depth may be at most about 60 microns, at most about 50 microns, or at most about 40 microns. If a recess has a long axis, the width of the recess may be constant along the length of the recess (as in FIG. 10), or it may vary along the length (as in FIGS. 11 and 12). In various embodiments, the width of a recess (which may be measured at any suitable location of the recess, and may be the diameter in the case of a generally circular recess) may be at least about 20 microns, at least about 40 microns, or at least about 60 microns. In further embodiments, the width of a recess may be at most about 140 microns, at most about 120 microns, or at most about 100 microns. In various embodiments, the edge-to-edge spacing between nearest edges of adjacent recesses of a discontinuous line of weakness (e.g., as measured generally along the transverse axis of backing 2) may be at least about 10 microns, at least about 20 microns, or at least about 30 microns. In further embodiments, the edge-to-edge spacing between recesses may be at most about 200 microns, at most about 100 microns, or at most about 60 microns.

In any of the aforementioned continuous or discontinuous lines of weakness provided by one or more recesses, the depth of an individual recess may vary; and/or different recesses may comprise different depths (whether variable or constant). Recesses may be of different widths or of the same width. A recess width may vary along its inward-outward depth relative to the plane of backing 2 (e.g., when viewed in cross section), e.g. so that it is tapered as in grooves 211 of FIG. 1, and/or a recess can be any suitable shape when viewed in cross section. That is, a recess may comprise a constant width along its depth, may comprise a flat bottom, an arcuate bottom, etc., and/or flat walls, sloped walls, arcuate walls etc. The recess may or may not be symmetric when viewed in cross section. All that is required is that the recesses be designed and arranged with appropriate geometry (e.g., depths, widths, spacings, etc.) so as to, individually or collectively, provide a line of weakness 210 that imparts the herein-described ability to hand-tear backing 2 at least generally transversely across its width.

Whether lines of weakness are continuous or discontinuous (with mixtures of both being encompassed within the disclosures herein), the spacing between individual lines of weakness 210 may be constant down the length of backing 2, or may vary. All of the lines of weakness do not have to be oriented at the same angle (e.g., relative to the transverse axis of backing 2). Furthermore, it should be noted that the concept of a multiplicity of lines of weakness as disclosed herein does not imply that the recess or recesses that individually or collectively provide a particular line of weakness 210 must necessarily be aligned strictly in a straight line. Rather, a continuous line of weakness 210 may be provided by a continuous groove that is somewhat arcuate, wavy, sinusoidal, sawtooth, or the like, as long as its overall path is at least generally transversely across backing 2 in the manner disclosed above. Similarly, a multiplicity of recesses arranged along a somewhat arcuate, wavy, sinusoidal, sawtoothed etc. path may likewise provide a discontinuous line of weakness 210. In some embodiments, of course, a generally linear, or strictly linear, path may be desired.

Lines of weakness 210 as described herein thus may enhance or promote the ability of backing 2 to be torn by hand in such a way that the propagating tear is steered in a desired (e.g., an at least generally transverse) direction, e.g. along a desired path. However, it will be appreciated that in some cases (e.g., as might occur in the case of discontinuous lines of weakness each comprised of a multiplicity of recesses, in the case of continuous lines of weakness that are spaced closely together along the longitudinal axis of backing 2, etc.) the propagation of a tear may not be directly along a strictly straight-line path. For example, a tear may propagate along one line of weakness for a portion of the way across the transverse width of backing 2, and may then jump to a second, adjacent line of weakness (e.g., a recess thereof) and then continue propagating transversely along the second line of weakness, and so on. Such phenomena may be acceptable as long as it does not cause the tear propagation to unacceptably deviate from a desired (e.g. an at least generally transverse) path across the width of backing 2. Thus, the concept of a multiplicity of lines of weakness is used broadly herein, and encompasses cases in which it may not necessarily be easy, or possible, to discern exactly which particular line of weakness may be followed when backing 2 is hand-torn. All that is required is that the microstructured recesses, individually or collectively, are capable of causing a tear to initiate and propagate at least generally transversely across the width of backing 2 as described herein. In some embodiments, of course, it may be preferred that the tear progression occur generally, or completely, along a single line of weakness.

It will be appreciated that lines of weakness 210 may enhance the ability of a hand-tear to be initiated, in addition to enhancing the ability of a propagating hand-tear to be steered in a desired direction. As such, in some embodiments it may be advantageous for a recess that comprises at least a portion of a line of weakness to be present at minor edge 11 of backing 2, and likewise for a recess to be present at minor edge 12 of backing 2. This may be provided, for example, by a line of weakness that is a continuous groove (such as, e.g., exemplary groove 211 of FIGS. 1-3) that extends to minor edges 11 and 12 of backing 2. Or, in the case of a discontinuous line of weakness, the multiplicity of recesses that make up the line of weakness may be arranged such that a recess is present at minor edge 11 of backing 2, and that a recess is likewise present at minor edge 12 of backing 2. In either case, a line of weakness 210 is provided that extends across the entire transverse width of second major side 200 of backing 2, from one minor edge 11 to other minor edge 12.

By microstructured paint-retention pattern 103 is meant that first major side 100 of backing 2 tape 1 comprises a multiplicity of microreceptacles 101 that are defined (i.e., bounded, whether continuously or discontinuously) by microstructured partitions 102 (e.g., as shown in exemplary manner in FIGS. 1 and 3) and that are configured to capture and/or retain liquid paint that impinges upon first major side 100 of tape 1. As such, at least some of microreceptacles 101 are (e.g. when a length of tape 1 is unwound from a roll) in an exposed configuration on first major side 100 of backing 1 rather than being filled with, covered by, or submerged beneath, another layer or layers that would prevent liquid paint from entering microreceptacles 101 from a direction generally normal to backing 2. (However, such an exposed configuration does not preclude partitions 102 from being coated with one or more conformal coatings, e.g. low adhesion backsizes and the like, in such manner that partitions 102 still define microreceptacles 101 that are capable of capturing and/or retaining liquid paint.) In various embodiments, each microreceptacle 101 may comprise an area of at least 10,000 square microns, at least about 15,000 square microns, or at least about 20,000 square microns. In further embodiments, each microreceptacle 101 may comprise an area of at most about 700,000 square microns, about 400,000 square microns, about 100,000 square microns, or about 70,000 square microns. By microstructured partitions is meant that partitions 102 (which may be continuous or discontinuous, as discussed in detail herein) each comprise a predetermined, molded structure (e.g., as obtained by molding a polymeric thermoplastic resin against a tooling surface that comprises the negative of the features desired to be provided on first major side 100 of backing 2). It will be appreciated that molded structures and features as defined herein (with respect to partitions 102 as well as to recesses that provide lines of weakness 210) are distinguished from features that are achieved by post-processing (e.g., by coating, depositing, ablation, perforation, punching, drilling, and the like). By microstructured partition is also meant that a partition 102 comprises a height ranging from about 20 microns to about 120 microns. In this context the partition height may often be the distance from major surface 15 of major side 100 of backing 2, to the outwardly-most extending portion of a partition, measured along an axis normal to the plane of backing 2. By microstructured partition is further meant that a partition has a dimension ranging from about 5 microns to about 200 microns along at least one axis that is orthogonal to the plane of backing 2. By way of specific example, for a partition 102 in the form of elongate rib 120 as shown in FIG. 1, the partition height, i.e. the distance by which outwardmost portion (top) 111 of rib 120 is spaced outwardly away from (above) first major surface 15 of backing 2, along an axis normal to the major plane of backing 2, may be in the range of 20 to 120 microns. And, the lateral width of rib 120 (measured at any point, ranging from the base 112 to the top 111 of rib 120) may be in the range of about 5 microns to about 200 microns. If so, rib 120 is by definition a microstructured feature irrespective of the fact that it may have an extremely long length. In some embodiments, microstructured partitions 102 are present in regular, predictable, repeating patterns.

In various embodiments, the height of partitions 102 (whether in the form of continuous elongate ribs, discontinuous rib segments, posts, etc.) may be at most about 110 microns, at most about 100 microns, at most about 90 microns, or at most about 80 microns. In further embodiments, the height of partitions 102 may be at least about 30 microns, at least about 40 microns, or at least about 50 microns. In various embodiments, at least some of partitions 102 may be tapered (e.g., as shown in exemplary illustration in FIG. 1) so as to comprise a top with at least one dimension, e.g. lateral width, that is less than 80%, less than about 60%, or less than about 40%, of the corresponding dimension of the base. For example, ribs 120 and/or ribs 133 may be tapered, as in FIG. 1, so that their width at tops 111/131 is less than about 80% of their width at bases 112/132, respectively. The top of partitions 102 (e.g., as exemplified by tops 111 and 131 of elongate ribs 120 and 133, respectively) may comprise a generally flat area, or may be smoothly curved. Any portion (e.g., top, body, base) of at least some partitions 102 may optionally comprise small-scale secondary features or the like.

Figure 20:
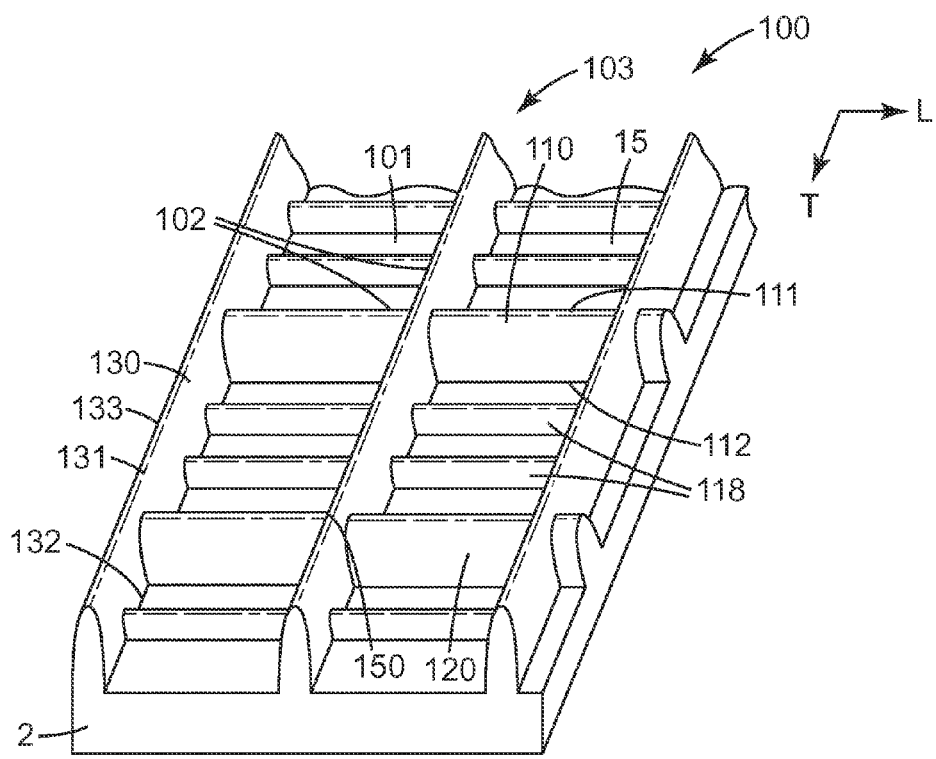
FIG. 20 is a perspective view, from the first major side, of the backing of another exemplary microstructured tape.

In some embodiments, major surface 15 of first major side 100 of backing 2, from which partitions 102 protrude, may comprise a generally plano (flat) surface. In some embodiments, major surface 15 of backing 2 within one or more microreceptacles 101 may comprise optional secondary features. Such secondary features may comprise e.g. one or more protruding features of e.g. 10 microns or less in height (such as, e.g. riblets 118 as shown in exemplary manner in FIG. 20, but also possibly comprising posts, mounds, bumps, and the like), e.g. located within one or more microreceptacles 101 and protruding from major surface 15 therewithin. Recessed secondary features, and/or mixtures of protruding and recessed secondary features, may also optionally be present. In whatever form, such secondary features may cause the bottom (e.g., floor) of a microreceptacle 101 to comprise an increased surface area, an increased surface roughness, etc., which may e.g. enhance the anchorage of paint within microreceptacle 101 in some instances. Even if such features are present, if a plano major surface 15 is discernible, it may be used as a reference plane for purposes of determining the height of a partition 102. However, in some embodiments major surface 15 may not be flat; e.g., it may comprise a somewhat rough surface (which may be a regular or irregular pattern) with no easily discernible plano surface. If so, the height of a partition 102 may be measured relative to the average plane of such an irregular or variable major surface.

Figure 18:
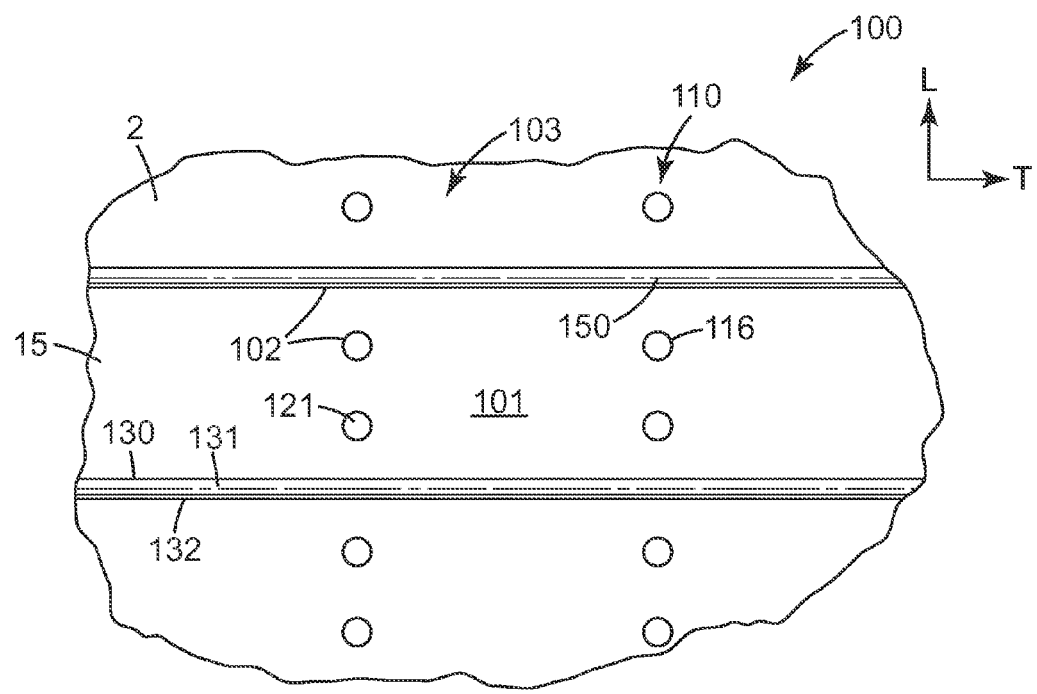
FIG. 18 is a plan view of the first major side of a portion of the backing of another exemplary microstructured tape.
Figure 19:
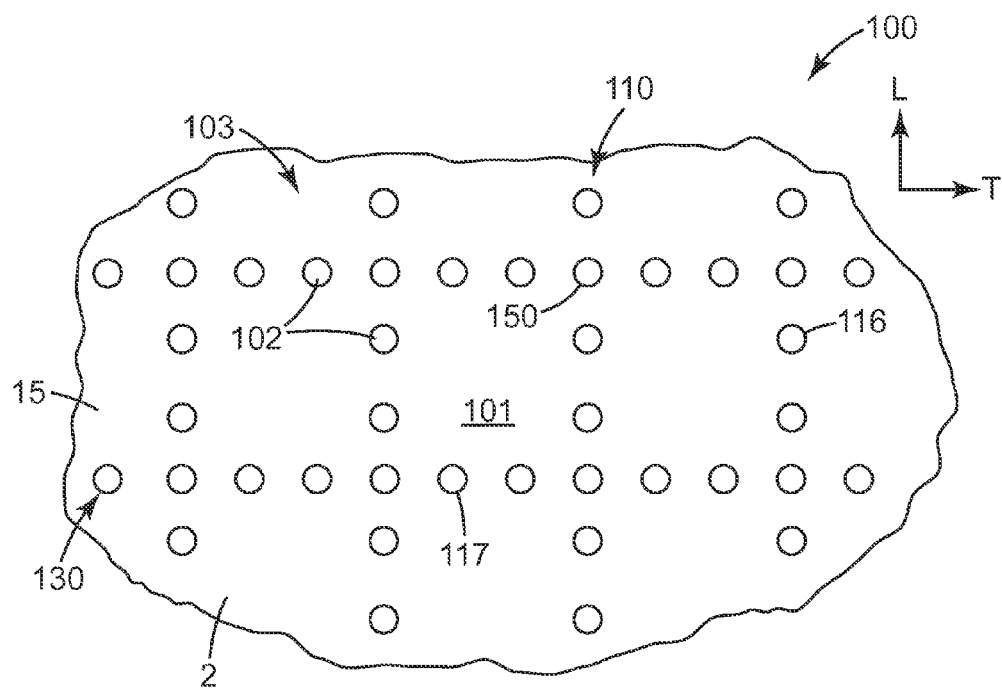
FIG. 19 is a plan view of the first major side of a portion of the backing of another exemplary microstructured tape.

Microstructured partitions 102 may comprise a multiplicity of first elongate partitions 110 that may not physically intersect with each other, and a multiplicity of second elongate partitions 130 that may not physically intersect with each other, with at least some of first partitions 110 intersecting with at least some of second partitions 130 at intersections 150 so as to define microreceptacles 101 thereby. Such intersecting of first partitions 110 with second partitions 130 may comprise actual physical intersections of first and second partitions 110 and 130, as with intersections 150 of FIGS. 1 and 14. Or, such an intersection of first partitions 110 with second partitions 130 may comprise the intersecting of paths followed by discontinuous partitions, as with intersections 150 of first partitions 110 and second partitions 130 in FIGS. 18 and 19 (discussed in detail later herein). In some such cases, such an intersection of first partitions 110 with second partitions 130 may comprise a point in space rather than an actual physical portion of a partition.

As mentioned, first partitions 110 may follow paths such that the individual first partitions 110 do not physically intersect with each other, and second partitions 130 may follow paths such that the individual second partitions 130 do not physically intersect with each other. In some embodiments, first partitions 110 may be strictly linear and parallel to each other along substantially their entire elongate length; likewise, second partitions 130 may be strictly linear and parallel to each other along substantially their entire elongate length.

In other embodiments, at least some of first partitions 110 may be nonlinear (e.g., may follow a path that is arcuate, sinusoidal, etc.) but may be locally parallel to each other (e.g., at their points of closest approach to each other), as may second partitions 130. In other embodiments, at least some of first partitions 110 may not be locally parallel, but may still follow overall paths so that the individual first partitions 110 do not intersect with each other, as may second partitions 130. In some embodiments, the spacings between first partitions 110 may be constant, the spacings between second partitions 130 may be constant, and the first and second partition spacings may be the same (i.e., so that microreceptacles 101 are square), as in the exemplary designs of FIGS. 1 and 3. In other embodiments, first partitions 110 may be spaced different distances from each other than second partitions 130 are spaced from each other (i.e., microreceptacles 101 defined by partitions 110 and 130 may be rectangular rather than square). The spacings between individual partitions 110, and/or between individual partitions 130, may vary rather than being constant.

In some embodiments, first elongate partitions 110 may be provided so that their elongate lengths (long axes) are generally orthogonal to the elongate lengths of second partitions 130 (whether partitions 110 and/or 130 are continuous or discontinuous along their elongate lengths, as discussed in detail later herein), e.g. as in the exemplary embodiment of FIGS. 1 and 3. The terminology of generally orthogonal is used broadly and is not intended to limit to a case in which first and second partitions 110 and 130 are aligned strictly at right angles to each other. Rather, generally orthogonal encompasses any angle between 70 and 110 degrees (e.g., such that microreceptacles 101 may be somewhat diamond-shaped rather than square). In further embodiments, the angle between first and second partitions may be between 80 and 100 degrees, or between 88 and 92 degrees (e.g., so as to provide square microreceptacles 101).

First and second partitions 110 and 130 of first major side 100 of backing 2 may be provided at any convenient orientation with regard to lines of weakness 210 of second major side 200 of backing 2. However, in some embodiments some or all of second partitions 130 may be substantially aligned with lines of weakness 210, meaning having a long axis that is oriented within plus or minus about 20 degrees of the long axis of lines of weakness 210. In further embodiments, some or all of second partitions 130 may have a long axis that is oriented within plus or minus about 10 degrees of the long axis of lines of weakness 210. In specific embodiments, some or all of second partitions 130 may be in strict alignment with lines of weakness 210, meaning having a long axis that is oriented within plus or minus about 5 degrees of the long axis of lines of weakness 210. It will be appreciated that designs in which second partitions 130 are e.g. substantially aligned, or strictly aligned, with lines of weakness 210, may enhance the ability of backing 2 to be hand-torn along a line or lines of weakness 210. That is, such arrangements may minimize the number of second partitions 130 that must be torn through (broken) in order to hand-tear backing 2 along a line or lines of weakness 210.

First and second partitions 110 and 130 may be provided at any convenient orientation with regard to the longitudinal and transverse axes of backing 2. However, in some embodiments some or all of second partitions 130 may be oriented at least generally transversely to backing 2, meaning having a long axis that is oriented within plus or minus about 45 degrees of the transverse axis of backing 2. In further embodiments, some or all of second partitions 130 may be oriented within plus or minus about 30 degrees, plus or minus about 20 degrees, or plus or minus about 10 degrees, of the transverse axis of backing 2. In specific embodiments, some or all second partitions 130 may be in strict alignment with the transverse axis of backing 2, meaning having a long axis that is oriented within plus or minus about 5 degrees of the transverse axis of backing 2 (e.g., as exemplified by partitions 130 of FIGS. 1 and 3).

It will be appreciated that a partition does not necessarily need to be continuous to have a long axis, as will be apparent from later discussions herein. It will also be appreciated that any condition regarding the angular alignment (orientation) of partitions relative to lines of weakness, does not require that the partitions be placed at any particular position (e.g. along the longitudinal axis of backing 2) relative to lines of weakness 210. For example, lines of weakness 210 may be longitudinally spaced at e.g. 800 microns, and partitions 130 may be longitudinally spaced at e.g. 150 microns. In such a case, some partitions 130 may have a line of weakness directly opposite them through the thickness of backing 2, while other partitions 130 may be positioned opposite spaces in between adjacent lines of weakness on the opposite side of backing 2. That is, it is not required that lines of weakness of the second major side, and partitions of the first major side, have the same spacing and/or are in registration with each other, although this may be done if desired.

It will be appreciated that a design in which at least some of second partitions 130 are oriented generally transversely to backing 2 may enhance the ability of backing 2 to be hand-torn at least generally transversely across the width of backing 2. That is, such arrangements may minimize the number of second partitions 130 that must be torn through (broken) in order to hand-tear backing 2 across its transverse width. Designs in which second partitions 130 are oriented strictly transversely to backing 2 may likewise enhance the ability of backing 2 to be hand-torn in a direction strictly transverse to backing 2.

Some or all of first partitions 110 may be at least generally longitudinally aligned with backing 2, meaning having a long axis that is oriented within plus or minus about 45 degrees of the longitudinal axis of backing 2. In further embodiments, some or all of first partitions 110 may be oriented within plus or minus about 30 degrees, plus or minus about 20 degrees, or plus or minus about 10 degrees, of the longitudinal axis of backing 2. In a specific embodiment, some or all first partitions 110 may be in strict alignment with the longitudinal axis of backing 2, meaning having a long axis that is oriented within plus or minus about 5 degrees of the longitudinal axis of backing 2 (e.g., as exemplified by partitions 110 of FIGS. 1 and 3).

In specific embodiments, first partitions 110, and second partitions 130, may each comprise continuous, elongate ribs (as exemplified by first elongate ribs 120 and second elongate ribs 133 of FIGS. 1 and 3). Thus, in embodiments of the type exemplified in FIGS. 1 and 3, first major side 100 of backing 2 may comprise a multiplicity of first partitions 110, each partition 110 comprising a continuous rib 120 with base 112 and top 111, with a height, width, and an elongate length, and with the elongate length being generally, e.g. strictly, aligned with the longitudinal axis of backing 2 and of tape 1. First major side 100 of backing 2 may additionally comprise a multiplicity of second partitions 130, each partition 130 comprising a continuous rib 133 with base 132 and top 131, with a height, width, and an elongate length, and with the elongate length (long axis) being generally, e.g. strictly, aligned with the transverse axis of backing 2 and of tape 1. As shown in the specific embodiment of FIG. 1, elongate ribs 120, and elongate ribs 133, may each comprise a uniform height that does not vary along the length of the rib. In particular embodiments, the height of ribs 120 may be equal to that of ribs 133, again as shown in FIG. 1.

In various embodiments, first partitions 110 may be designed so as to enhance the ability of backing 2 to be hand-torn at least generally along the transverse axis "T" of the backing. For example, if first partitions 110 are e.g. generally, or strictly, aligned with the longitudinal axis "L" of backing 2, at least some of these partitions may need to be torn during the at least generally transverse hand-tearing of tape 1 (in contrast to e.g. second partitions 130 that may be generally or strictly aligned with transverse axis "T" and thus may be aligned at least generally parallel to the tear direction and thus may not need to be torn during the at least generally transverse hand-tearing of tape 1). At least some of first partitions 110 may thus be designed and/or arranged so as to minimize the resistance to hand-tearing that they provide.

Figure 14:
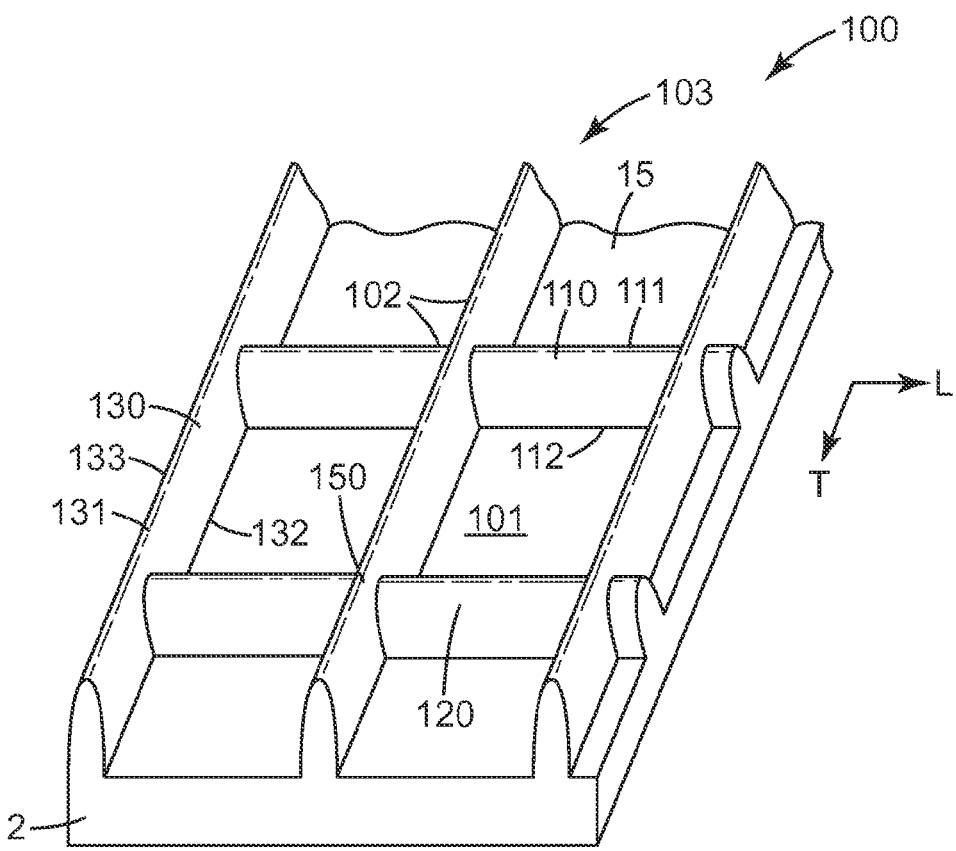
FIG. 14 is a perspective view, from the first major side, of a portion of the backing of another exemplary microstructured tape.

One manner in which this can be done is shown in exemplary manner in FIG. 14. (In FIGS. 14-17 and 20, tear pattern 203, and pressure-sensitive adhesive 300, are omitted for clarity). In designs of this type, at least some of first (generally longitudinally-oriented) elongate ribs 120 may be shorter in height than second elongate ribs 133. Such shorter ribs may present less resistance to being torn through in the process of hand-tearing the backing at least generally transversely across its transverse width. In various embodiments, each first rib 120 may comprise a uniform height, with the uniform height being less than about 80%, or less than about 60%, of the height of second ribs 133. In further embodiments, each first rib 120 may comprise a uniform height that is at least about 20%, or at least about 40%, of the height of second ribs 133. For example, ribs 133 may be of around 70 microns in height and ribs 120 may be around 50 microns in height. All such segments of all such ribs 120 may be at this lower height (with a segment of a rib 120 meaning a length of the rib between its intersections 150 with second ribs 133), as in the exemplary embodiment of FIG. 14. In alternative arrangements, only certain ribs, or certain segments of ribs, might be at such a lower height. For example, only every second, third, fourth or fifth rib 120 may be at such a lower height. Although not shown in any Figure, some or all of first ribs 120 may be (in addition to, or instead of, being shorter in height than second ribs 133), narrower in thickness than second ribs 133; e.g. toward their base, toward their top, and/or any portions therebetween, which may also enhance the ability of backing 2 to be at least generally transversely hand-torn.

Figure 15:
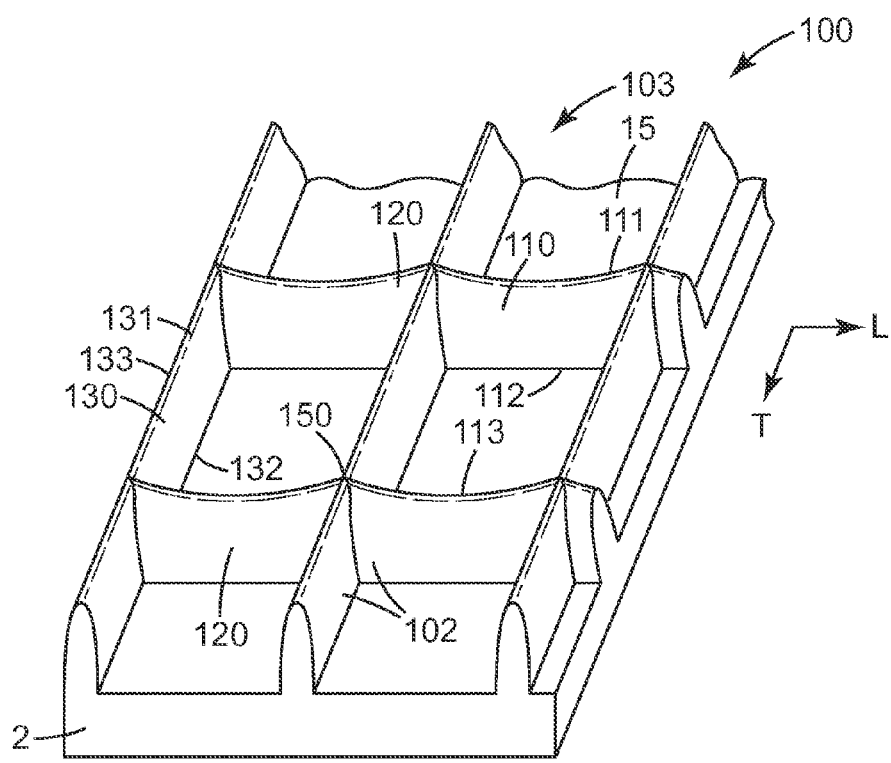
FIG. 15 is a perspective view, from the first major side, of a portion of the backing of another exemplary microstructured tape.

Another manner in which first partitions 110 may be configured to enhance the ability of backing 2 to be at least generally transversely hand-torn is shown in exemplary manner in FIG. 15. In designs of this general type, first ribs 120 may be provided in which continuous rib segments (i.e., segments that extend continuously between intersections 150 with second ribs 133) comprise smoothly varying profiles such that the height of a portion of rib 120 at a location 113 that is between its intersections 150 and is distal to intersections 150 (e.g., that is approximately halfway between intersections 150) is less than the height of the rib segment at points adjacent its intersections 150 with second ribs 133. In various embodiments, the heights of ribs 120 at locations 113 distal to intersections 150 may be less than 80% of, less than 70% of, or less than 60% of, the heights of ribs 120 at locations adjacent intersections 150 with second ribs 133. In such designs, the height of some or all of ribs 120 may, at their intersections 150 with ribs 133, be generally the same as the height of ribs 133 (as in the exemplary design of FIG. 15), or may be less than (e.g., no more than 80% of) the height of ribs 133. Although it may not necessarily enhance the ability of backing 2 to be at least generally transversely hand-torn, if desired second ribs 133 may likewise comprise smoothly varying profiles such that the height of rib portions at locations between intersections with first ribs 120 is less than that at points adjacent intersections with first ribs 120 (e.g. as in the Representative Working Example presented later herein).

Figure 16:
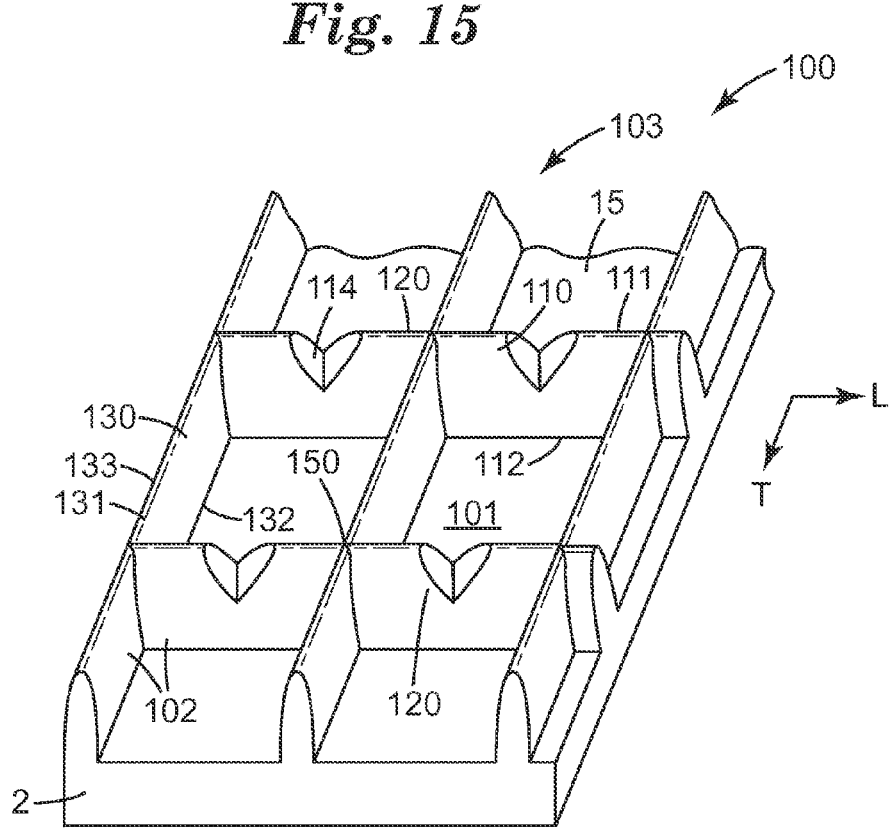
FIG. 16 is a perspective view, from the first major side, of a portion of the backing of another exemplary microstructured tape.

Another manner in which first partitions 110 may be configured to enhance the ability of backing 2 to be at least generally transversely hand-torn is shown in exemplary manner in FIG. 16. In designs of this type, at least one notch 114 is provided in a portion of a segment of rib 120. Notch 114 (which may be V-shaped, square-bottomed, etc.) may comprise a lowest point at which the local height of rib 120 is less than about 80% of the height of rib 120 at locations adjacent rib 120's intersections 150 with ribs 133. In various embodiments, the depth of notch 114 may be chosen so that this local rib height is less than about 80%, less than about 60%, less than about 40%, or less than about 20%, of the height of rib 120 at locations adjacent rib 120's intersections 150 with ribs 133.

Figure 17:
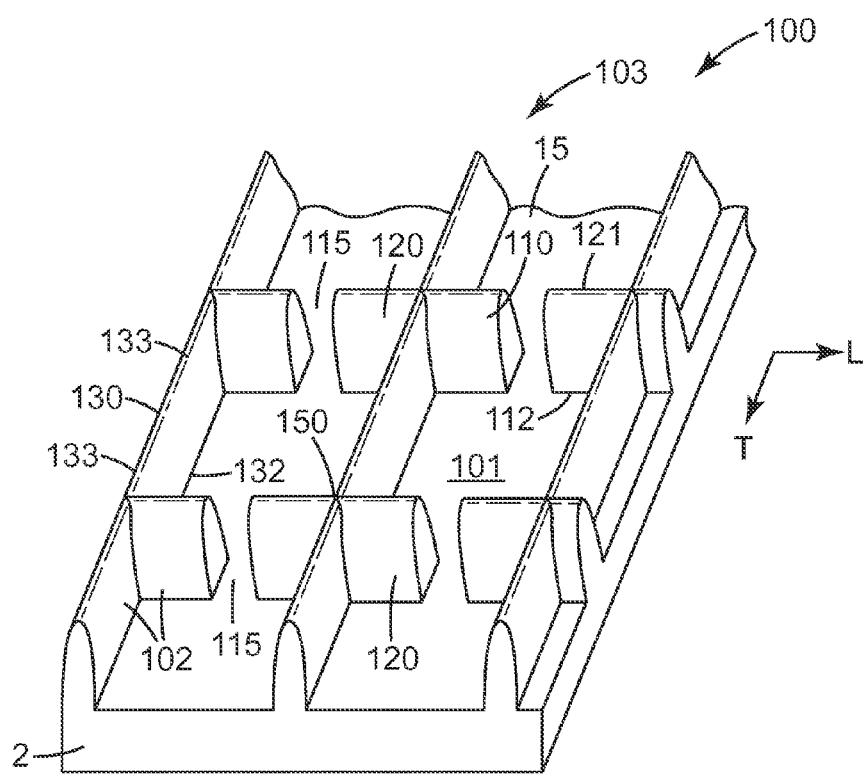
FIG. 17 is a perspective view, from the first major side, of a portion of the backing of another exemplary microstructured tape.

In a variation of this approach, the exemplary design of FIG. 17 comprises discontinuous partitions 110 in the form of discontinuous ribs 121. In this context, a discontinuous rib means one comprising at least one gap in which major surface 15 of first major side 100 of backing 2 is visible (noting that partitions 110 e.g. in the form of ribs 120 as in FIG. 1 are defined as continuous, notwithstanding their intersections 150 with partitions 130). In the exemplary design of FIG. 17, one such gap 115 is provided in each segment of discontinuous ribs 121. A further variation of such an approach is shown in exemplary manner in plan view in FIG. 18, in which first partitions 110 comprise discontinuous partitions in the form of outwardly-protruding posts 116. Although shown as generally circular in FIG. 15, such posts can be of any convenient shape. Those of ordinary skill will appreciate that in designs of this type posts 116 may, if appropriately designed and spaced, collectively function as a partition 110 (e.g., in a "picket fence" manner), to at least a sufficient extent to satisfactorily prevent or minimize the passage of liquid paint. In other words, it is not necessary that both, or even either, of partitions 102 must be continuous. This being the case, still another potential design is shown in exemplary manner in FIG. 19, in which not only the first partitions 110 are discontinuous (as provided by posts 116), but second partitions 130 are as well (as provided by posts 117). Those of ordinary skill in the art will appreciate that in order to collectively comprise partitions, a set of posts does not necessarily have to be positioned in a strictly linear format (e.g., as in FIGS. 15 and 16). Rather, the posts could be provided in a curved, sinusoidal, staggered, zig-zag, etc. format, as long as the posts are e.g. sufficiently close to each other and of sufficient height and size (e.g., width or diameter) to collectively provide a partition 102. Although shown as circular in FIGS. 18 and 19, such posts may be any convenient shape.

Any combination of the above approaches can be used. That is, if a notch 114 or gap 115 in one or more ribs 120 is to be used, such ribs 120 may be the same height as ribs 133, or may be a lower height. And, in such cases a rib 133 may comprise a generally uniform height, or may have an arcuate profile similar to that shown in FIG. 15. Not all ribs 133 need be identical, of course. Furthermore, those of ordinary skill will understand that there may be no firm dividing line between many of the above designs. For example, there may be no firm dividing line between a design of the type shown in FIG. 16 in which a segment of a first rib 120 comprises portions of generally constant and equal height, that are interrupted by notch 114 that comprises the lowest rib height, and a design of the type shown in FIG. 15 in which a segment of a first rib 120 comprises a height that decreases more or less smoothly and continuously to a point 113 that comprises the lowest rib height. Likewise, there may be no firm dividing line between a notch 114 as in FIG. 16 and a gap 115 as in FIG. 17. Still further, there may be no firm dividing line between a discontinuous rib 121 of the general type of FIG. 17 (comprising rib segments interrupted by a gap or series of gaps) and a series of posts 116 of the general type illustrated in FIGS. 18 and 19. All such variations and combinations will be understood to be encompassed by the disclosures herein, not merely those representative designs that were chosen to serve as exemplary illustrations.

Still further, it should be noted that any such combination or design may be chosen from those presented herein, in order to enhance the widthwise hand-tearability of backing 2 while also enhancing the ability of paint-retention pattern 103 to capture and retain paint. Thus, for example, some (e.g., two out of three, four out of five, etc.) of first partitions 110 may comprise ribs of a relatively low height and/or may comprise notches, gaps and/or discontinuities, with only a certain remaining number of ribs having a relatively high height and/or not comprising notches, gaps, discontinuities, etc. These remaining ribs may be spaced apart from each other by intervening lower/notched/gapped and/or discontinuous ribs. The presence of the lower and/or notched or gapped or discontinuous first partitions may enhance the widthwise hand-tearability of backing 2, while the occasional, spaced-apart first partitions that are higher and/or that do not comprise notches, gaps or discontinuities, may ensure that the paint-retention pattern 103 still satisfactorily captures and retains paint.

It should further be noted that while features such as notches, gaps, ribs or rib segments that differ in height, etc., have been primarily discussed above with regard to first partitions 110, any such features and designs might also be employed with second partitions 130, if desired. If desired, other features (e.g., the aforementioned secondary structures) can be provided within microreceptacles 101, e.g. protruding from major surface 15 of backing 2, as desired for particular purposes.

Backing 2 and microstructured paint-retention pattern 103 of first major side 100, and microstructured hand tear pattern 203 of second major side 200, are defined herein as constituting a monolithic plastic unit made of a monolithic plastic material. By this is meant that partitions 102 that define microstructured paint-retention pattern 103 (whether partitions 102 are in the form of continuous partitions as in FIG. 1, discontinuous partitions as in FIG. 16 or 17, etc.) are integrally connected to backing 2 and were formed by being molded therewith. Likewise, this means that the portions of material (e.g., surfaces) that define the recessed features (e.g., grooves, valleys, holes, etc.) that provide lines of weakness 210 of hand-tear pattern 203 of second major side 200 are integrally connected to backing 2 and were formed by being molded therewith. Such a monolithic plastic unit may be conveniently formed e.g. by providing a polymeric thermoplastic film or a molten polymeric thermoplastic extrudate and molding both major surfaces (e.g., simultaneously) so as to form backing 2, partitions 102 that define microstructured paint-retention pattern 103, and the recesses that provide lines of weakness 210 of microstructured hand-tear pattern 203, all at the same time, as an integral unit. In various embodiments, the overall thickness of backing 2, from second major surface 215 of second major side 200, to the outermost portion of partitions 102 (e.g., to the tops 111 and 131 of ribs 120 and 133, respectively, with respect to the exemplary embodiment of FIG. 1), may be at least about 25 microns, at least about 50 microns, at least about 60 microns, or at least about 70 microns. In further embodiments, the overall thickness of backing 2 may be at most about 250 microns, at most about 140 microns, at most about 120 microns, or at most about 100 microns. In some embodiments, the material that comprises backing 2, the material that comprises partitions 102 that define microstructured paint-retention pattern 103 of first major side 100, and the material whose surfaces define the recesses (e.g., grooves, valleys, holes, etc.) that provide lines of weakness 210 of hand-tear pattern 203 of second major side 200, are all of the same composition.

The plastic material of backing 2 is by definition a moldable polymeric thermoplastic material that is not a foamed or porous material. In some embodiments, the plastic material may be noncellulosic, meaning that it contains less than about 5 wt. % cellulosic material (e.g., cellulose, paper, regenerated cellulose, wood fibers, wood flour, etc., with, in this context, cellulose acetate and the like not considered to be cellulosic materials). In particular embodiments, the plastic material may be melt-processable, e.g. extrudable. The moldable polymeric thermoplastic material may be made from, or include, any of a variety of materials. Homopolymers, copolymers and blends of polymers may be useful, and may contain a variety of additives. Suitable thermoplastic polymers may include, for example, polyolefins such as polypropylene or polyethylene; polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and engineering polymers such as polyketones or polymethylpentanes. Mixtures of such polymers may also be used.

In some embodiments, the plastic material may be a polyolefinic material, defined herein as being any homopolymer, copolymer, blend, etc., of any olefinic polymers (e.g., polyethylenes, polypropylenes, and so on). In some embodiments, the polyolefinic material may contain at least about 90 wt. %, at least about 95 wt. %, or at least about 98 wt. % of polyethylenes, not counting the weight of any mineral fillers that may be present. (In this context, by polyethylenes are meant polymers comprised of at least 95% ethylene units. In further embodiments, the polyethylenes are ethylene homopolymers.) In some embodiments, the polyolefinic material may consist essentially of ethylene homopolymers, noting that this requirement (in addition to not including the weight of any mineral fillers) does not preclude the presence of processing aids, plasticizers, antioxidants, colorants, pigments, and the like, at least some of which may contain some small level of non-polyethylene polymers. In certain embodiments, the polyolefinic material may contain substantially no polypropylene, as well as substantially no non-olefinic polymers. (Those of ordinary skill will appreciate that as used herein, the term "substantially no" does not preclude the presence of some extremely low, e.g. 0.5% or less, amount of material, as may occur e.g. when using large scale production equipment subject to customary cleaning procedures.)

Suitable polyethylene homopolymers for use in backing 2 may include e.g. high-density polyethylene, medium-density polyethylene, low-density polyethylene, linear low-density polyethylene, ultra-low-density polyethylene, and the like. In specific embodiments, the polyethylene homopolymers may consist essentially of a blend of low density polyethylene (LDPE, i.e. having a density of between 0.88 g/cc and 0.93 g/cc) and high density polyethylene (HDPE, i.e. having a density of between 0.94 g/cc and 0.97 g/cc), at a weight ratio of from about 90:10 LDPE:HDPE to about 10:90 LDPE: HDPE. In further embodiments, the weight ratio of LDPE to HDPE may be from about 70:30 to about 30:70, from about 60:40 to about 40:60, or from about 55:45 to about 45:55. In specific embodiments, the LDPE/HDPE blend may comprise one or more inorganic (e.g., particulate mineral) fillers, which may include e.g. calcium carbonate, kaolin, talc, silica, titanium dioxide, glass fibers, glass bubbles, and the like. Such fillers may be present e.g. at from about 2% to about 20% by weight of the total weight of the material of backing 2. Other additives may be included as desired for particular purposes.

Figure 21:
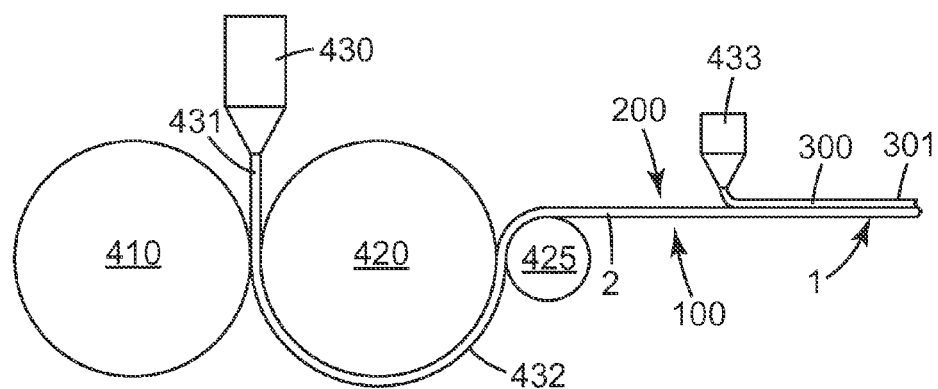
FIG. 21 is a diagrammatic view of an exemplary process for making a microstructured tape.

Shown in FIG. 21 is an exemplary apparatus and process 400 for making backing 2 and tape 1. Extruder 430 can be used to extrude molten polymeric thermoplastic extrudate 431, one major surface of which then contacts tooling roll 410, which roll bears on its surface the negative of the desired features to be imparted to first major side 100 of backing 2. Additionally the opposing major surface of extrudate 431 contacts tooling roll 420, which roll bears on its surface the negative of the desired features to be imparted to second major side 200 of backing 2. Conveniently, the contacting may be done essentially simultaneously, e.g. by impinging molten extrudate 431 into a narrow gap (nip) in between rolls 410 and 420. Those of ordinary skill will appreciate that, rather than rolls 410 and/or 420, such tooling surfaces as may be provided by tooling belts, platens, and the like, can be used if desired. The tooling surfaces may be metal (e.g., in the form of metal rolls), or may comprise softer materials, e.g. silicone belts, or polymeric sleeves or coatings disposed upon metal backing rolls). Such tooling surfaces, with the negative of the desired features thereon, may be obtained e.g. by engraving, knurling, diamond turning, laser ablation, electroplating or electrodeposition, or the like, as will be familiar to those of skill in the art.

If tooling rolls, e.g. metal tooling rolls, are used in combination with molten extrudate, it may be convenient to maintain the rolls at a temperature between about 21 degrees C. and about 93 degrees C. In various embodiments, the metal tooling rolls may be maintained at temperature of between about 30 degrees C. and about 79 degrees C., or between about 60 degrees C. and about 71 degrees C. If an extrusion process is used, in various embodiments the extrudable compositions (polymeric resins) may have a Melt Flow Index of between about 1 and 20, or between about 5 and 15. If desired, rather than molten extrudate 431, a pre-existing moldable polymeric thermoplastic film can be heated and contacted with tooling surfaces to mold the desired microstructured patterns on the major surfaces thereof.

Molten extrudate 432 that has been contacted with tooling surfaces so as to impart paint-retention pattern 103 to first major side 100 and hand-tear pattern 203 to second major side 200 can be solidified so as to form backing 2 with paint-retention pattern 103 and hand-tear pattern 203 upon the major surfaces thereof, as a monolithic plastic unit. It may be convenient that the molded extrudate be held in contact with a tooling surface, e.g. of a tooling roll, e.g. by following a path around significant portion of the roll as shown in exemplary manner in FIG. 21, to allow such solidification. If desired, a takeoff roll 425 may be provided to assist in the handling of the molded, solidified backing 2 upon its removal from a tooling roll. Pressure-sensitive adhesive 300 can then be disposed on second major side 200 of backing 2, e.g. by using coater 433. The deposition of pressure-sensitive adhesive 300 can be in-line in the same process as the molding, as in the exemplary configuration of FIG. 21. Or, it can be done off-line, in a separate process.

Pressure-sensitive adhesive (layer) 300 can be deposited onto second major side 200 by any suitable process, including for example coating methods including solvent coating methods or hot melt coating methods, e.g. knife coating, roll coating, reverse roll coating, gravure coating, wire wound rod coating, slot orifice coating, slot die coating, extrusion coating, or the like. In many cases such processes may involve the deposition of a pressure-sensitive adhesive precursor onto second major side 200 of backing 2 and then transforming the precursor into pressure-sensitive adhesive 300 (e.g., by removal of solvent, by curing or crosslinking, etc.). However provided, it may be desirable to dispose pressure-sensitive adhesive 300 onto second major side 200 so that the adhesive is not only in intimate contact with, and adhesively bonded to, second major surface 215 of backing 2, but so that the adhesive also penetrates into the recesses that form lines of weakness 210, and is in intimate contact with, and adhesively bonded to, the surfaces (e.g., walls, floor, etc.) of the recesses. Furthermore, it may be desirable to provide pressure-sensitive adhesive 300 at a thickness, relative to the depth of the recesses, such that the outward-facing surface 301 of adhesive 300 is generally flat even in the areas of adhesive 300 overlying the recesses of second major side 200 of backing 2 (e.g., rather than exhibiting depressions in those areas). In various embodiments, the thickness of pressure-sensitive adhesive 300 may be at least about 20 microns, at least about 30 microns, or at least about 40 microns. In further embodiments, the thickness of pressure-sensitive adhesive 300 may be at most about 100 microns, at most about 80 microns, or at most about 60 microns.

Any suitable pressure-sensitive adhesive material or composition can be used in pressure-sensitive adhesive 300. Pressure-sensitive adhesives are normally tacky at room temperature and can be adhered to a surface by application of, at most, light finger pressure and thus may be distinguished from other types of adhesives that are not pressure-sensitive. A general description of useful pressure-sensitive adhesives may be found in Encyclopedia of Polymer Science and Engineering, Vol. 13, Wiley-Interscience Publishers (New York, 1988). Additional description of useful pressure-sensitive adhesives may be found in Encyclopedia of Polymer Science and Technology, Vol. 1, Interscience Publishers (New York, 1964). It may be convenient that the adhesive material be chosen so as to provide good adhesion to a surface, while also being removable under moderate force without leaving a residue, e.g. a visible residue.

Examples of suitable materials for the pressure-sensitive adhesive may include e.g. polymers based on acrylate and/or methacrylate materials, natural or synthetic rubbers, block copolymers, silicones, and so on. Suitable polymers and/or monomer units therein may include, but are not limited to: polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers; poly-alpha-olefins, amorphous polyolefins, polysiloxanes, ethylene vinyl acetates, polyurethanes, polyvinylpyrrolidones, and any combinations thereof. Examples of suitable (meth)acrylate materials include polymers of alkyl acrylate or methacrylate monomers such as e.g. methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, and combinations thereof. Examples of commercially available block copolymers include those available under the trade designation KRATON from Kraton Polymers, Westhollow, Tex. Additionally, the adhesives can contain additives such as tackifiers, plasticizers, fillers, antioxidants, stabilizers, pigments, and the like.

Whether made by a process of the general type shown in FIG. 21 or by any other suitable process, tape 1 may be conveniently provided in the form of a roll 20 as shown in exemplary manner in FIG. 2. In some embodiments, tape 1, and roll 20 thereof, do not include any kind of release liner (e.g., a paper or plastic film bearing a release surface, whether supplied by the film itself or by a low-energy coating thereupon, such release liners being well known in the adhesive arts). That is, in such embodiments roll 20 is a self-wound roll meaning that it is wound directly upon itself with outward surface 301 of pressure-sensitive adhesive 300 being in releasable contact with the outwardmost surfaces of partitions 102 that define paint-retention pattern 103 of first major side 100 of backing 2. For example, if backing 2 is of the general type shown in FIG. 1, in roll 20 pressure-sensitive adhesive 300 would be in releasable contact with at least tops 111 and 131 of ribs 120 and 133 respectively. By releasable contact is meant that pressure-sensitive adhesive 300 is adhered to the outwardmost surfaces of partitions 102 sufficiently to provide roll 20 with adequate mechanical integrity to acceptably maintain the form of a roll (that is, so that the roll does not unacceptably unroll from its self-wound condition too easily), but so that the adhesive force between pressure-sensitive adhesive 300 and the outwardmost surfaces of partitions 102 is low enough that adhesive 300 can be debonded and separated from the partition surfaces without unacceptable force being necessary and without unacceptably damaging either the partitions or the adhesive or debonding the adhesive from second major side 200 of backing 2. This releasable contact may be gauged by way of the force required to unwind tape 1 from its self-wound condition, as measured e.g. by the procedure described in the Examples herein. As measured in this general manner, in various embodiments tape 1 may comprise an unwind force of at least 2, 3, or 4 ounces of force per inch width of tape (0.22, 0.33, or 0.44 N/cm width of tape). In further embodiments, tape 1 may comprise an unwind force of at most 40, 30, or 20 ounces of force per inch width of tape (4.4, 3.3, or 2.2 N/cm width of tape).

Those of skill in the art will appreciate that the adhesive properties of pressure-sensitive adhesive 300, and the design of paint-retention pattern 103, may be designed in combination so as to achieve a desired range of unwind force. That is, a paint-retention pattern 103 with more closely spaced partitions and/or with partitions with a wider top surface, which would provide an increased surface area for pressure-sensitive adhesive 300 to bond to, might advantageously be combined with a relatively weak (e.g., low-tack) pressure-sensitive adhesive composition; conversely, if the partitions are widely spaced and/or have very narrow top surfaces, they might advantageously be combined with a relatively strongly bonding pressure-sensitive adhesive. In this context, it may be useful to characterize the bondable surface area of partitions 102 that is available for pressure-sensitive adhesive 300 to bond to. For example, in the exemplary embodiment of FIG. 1, the bondable surface area may be provided by top surfaces 111 of first ribs 120 and by top surfaces 131 of second ribs 133. In the exemplary embodiment of FIG. 14, first ribs 120 may be sufficiently shorter in height than second ribs 133 that the bondable surface area may be provided only by top surfaces 131 of second ribs 133 (and, e.g., not by top surfaces 111 of first ribs 120). In the exemplary embodiment of FIG. 15 (with first ribs 120 that vary in height), the bondable surface area may be provided by top surfaces 131 of second ribs 133, and by a portion of top surfaces 111 of first ribs 120. In a case in which both first ribs 120 and second ribs 133 comprise arcuate shapes (e.g., in which both resemble the shape of first ribs 120 of FIG. 15) in which the rib portions at their intersections are the farthest outward-protruding, the bondable surface area may be provided mainly by the top surfaces of ribs at such intersections. In various embodiments and however achieved, the bondable surface area offered by partitions 102 may comprise at least about 1%, at least about 2%, at least about 5%, at least about 10%, or at least about 15%, of the nominal surface area (i.e., length times width) of first major side 100 of backing 2. In further embodiments, the bondable surface area may comprise at most about 35%, at most about 30%, or at most about 25%, of the nominal surface area of first major side 100 of backing 2.

In some embodiments, first major side 100 of backing 2 may comprise, in addition to partitions 102, outwardly protruding bonding features that are specially configured to provide bondable surface areas for pressure-sensitive adhesive 300 but which may not necessarily participate significantly in the process of capturing and/or retaining liquid paint. Such bonding features may be provided e.g. in the form of posts that extend outward beyond the outwardmost surfaces of partitions 102 and that comprise bondable areas upon their outwardmost surfaces.

If desired, first major side 100 of backing 2, e.g. at least the outwardmost portions and/or surfaces of partitions 102, may be treated to as to enhance or decrease the ability of pressure-sensitive adhesive 300 to adhere to it. Treatments which may decrease the bonding ability include e.g. the deposition of low surface energy conformal coatings to the outwardmost surfaces of partitions 102. Such low surface energy conformal coatings are conveniently available in the form of so-called low adhesion backsizes and the like. If desired, low adhesion backsize coatings may be applied in such manner (e.g., by gravure coating) that the coating is primarily applied only to the outwardmost surfaces (i.e., the surface areas that are bondable by pressure-sensitive adhesive 300) of partitions 102. Alternatively, such coatings may also be applied to surfaces within one or more microreceptacles 101, e.g. a floor surface of a microreceptacle 101, such as may be supplied by major surface 15 of backing 2 within a microreceptacle 101. Treatments which may increase the bonding ability may include e.g. corona treatment, plasma treatment, flame treatment, or the like; or, deposition (e.g., coating) of a primer, tie layer, or the like. (Those of ordinary skill will appreciate that such treatments, coatings, etc., may also enhance the ability of paint-retention pattern 103 to retain liquid paint and/or to anchor dried paint thereupon or therewithin). Likewise, if desired, second major side 200 of backing 2 can be treated so as to enhance the ability of pressure-sensitive adhesive 300 to adhere to it. Such treatment may comprise e.g. corona treatment, plasma treatment, flame treatment, or the like; or, deposition (e.g., coating) of a primer, tie layer, or the like.

In order to use tape 1, a length of the tape may be removed from an elongate length, e.g. a roll 20, of the tape. This may be performed by hand-tearing the tape across its transverse width, at the desired location, although scissors, a knife, or any other suitable cutting implement may be used if convenient. The hand-tearing may be performed by grasping, with each hand, portions of the tape that longitudinally bracket the desired tear location, and moving one portion of the tape in a first direction and the other portion in a generally opposite direction so as to apply shear force at the desired tear location to initiate and propagate a tear at least generally transversely across the width of the tape. Once the length of tape is thus obtained, it can be applied and adhered to a desired portion of a surface to be masked. Alternatively, a terminal portion of the tape may, while still attached to roll 20, be applied and adhered to a desired portion of a surface and then a remaining portion of the elongate length of the tape (e.g., roll 20 itself) may be manipulated (e.g., twisted or translated) so that the non-adhered portion of the tape is at least generally transversely torn in a location e.g. near the closest point at which the tape is adhered to the surface. Both of these methods are well known to those of skill in the art. If desired, tape 1 may be used in conjunction with a masking film, and may be conveniently applied (e.g., along with such a masking film) to a surface by use of a masking tool, e.g. the product available from 3M Company of St. Paul, Minn., under the trade designation 3M HAND-MASKER DISPENSER.

Tape 1 having been applied to a desired portion of a surface, adjacent portions of surfaces can then be painted as desired (the term paint is used broadly herein and encompasses any coating, primer, varnish, and the like). At any suitable time (e.g., after the paint has dried to a desired extent), tape 1 can then be removed from the surface. Tape 1 can be used to mask any desired surface in preparation for painting with any suitable liquid paint, whether such paint be applied with a sprayer, brush, roller, etc. (In this context a paint sprayer specifically excludes ink-jetting apparatus). Such paint may be e.g. latex or oil-based. Such paints may be distinguished from e.g. ink-jettable inks and the like, which are typically deposited only onto horizontally oriented surfaces (with respect to gravity), in very small volumes (e.g., picoliter-sized droplets). In such ink-jettable inks, the main concern is typically the quality of the formed image (e.g., minimizing the degree to which the deposited very small volumes of different color inks may migrate and/or diffuse into each other in such manner as to blur the colors and/or edges of images). In contrast, tape 1 as disclosed herein has been found to be capable of capturing and retaining gross quantities of paint, including high viscosity (e.g., >100 cps at 21 degrees C.) latex paints, and including when tape 1 is in a vertical orientation. To this end, it has been found that the paint-retention patterns disclosed herein exhibit a surprisingly high ability to capture and retain large quantities of liquid paint, as evidenced by the Examples herein. It has also been found that the paint-retention patterns disclosed herein provide paint which had been dried thereupon and/or therein with an enhanced ability to resist flaking off, as evidenced by the Examples herein. In particular, it has been found that dried paint is surprisingly resistant to flaking off of tape 1 even upon the stretching of tape 1 as may occasionally occur during removal of tape 1 from a surface.

Figure 22:
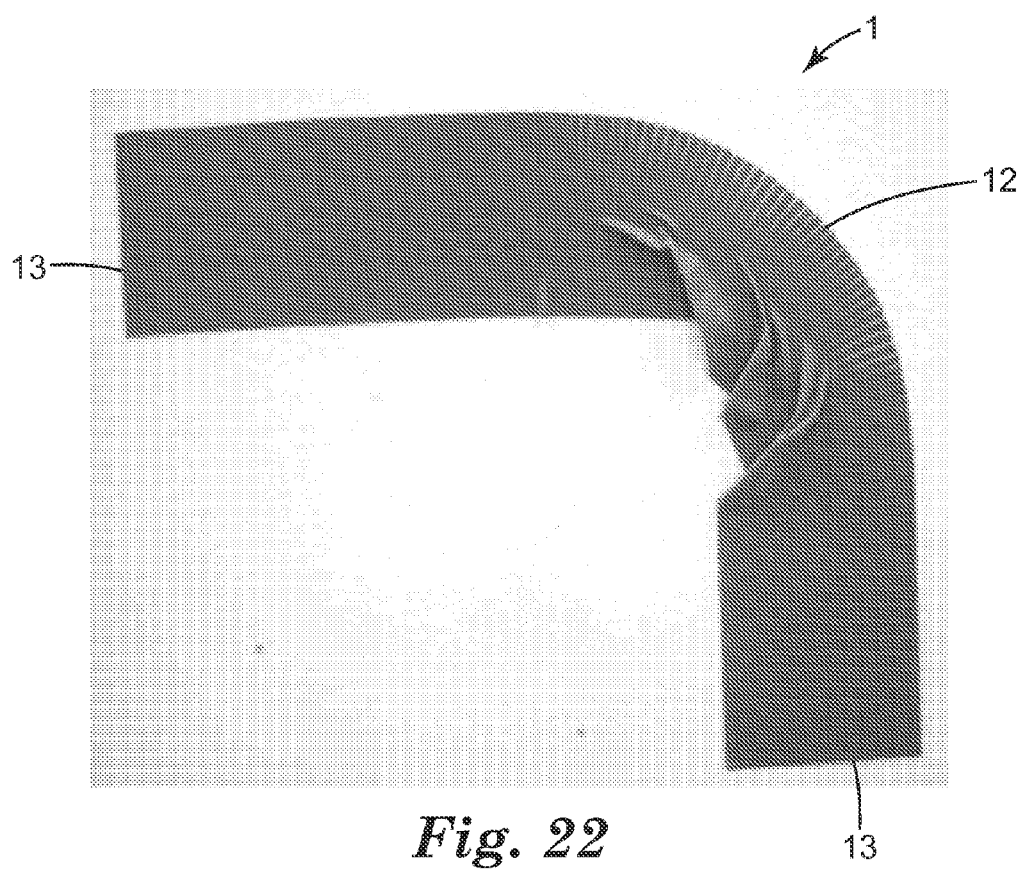
FIG. 22 is a digital photograph showing an exemplary microstructured tape that has been transversely curved into an arcuate shape.

Tape 1 as disclosed herein comprises an additional advantage in at least some embodiments, in that it can be extensively transversely curved (which might be done by some apparatus or device, but may be most likely to be done manually by a user of the tape) if desired. In this context, to transversely curve an elongate length of tape 1 means to form it into a continuous curved shape that lies in a generally flat plane (e.g., as shown in the digital image of an exemplary transversely curved tape 1 in FIG. 22). Such an ability may allow a single elongate length of tape 1 to be transversely curved to match a shape or edge (e.g., an edges of an oval or round window) that conventionally might require numerous short, linear lengths of tape to be used in combination, and/or might require lengths of tape to be manually folded, to match. Those of ordinary skill will appreciate that the ability of tape 1 to be extensively transversely curved means that at least some portions of backing 2, e.g. those close to one transverse minor edge of backing 2 (e.g., minor edge 12 of FIG. 22), must be able to stretch at least somewhat, without rupturing or tearing, upon application of stretching force to these portions of backing 2 in order to transversely curve tape 1. (Evidence of such stretching is visible near edge 12 as shown in FIG. 22.)

It will be further appreciated that the same portions of backing 2 must nevertheless be able to be at least generally transversely torn upon application of shear force to backing 2, in order that the hand-tear property of tape 1 is achieved. Such abilities might be expected to be in conflict with each other. Furthermore, it might be expected that the presence of first partitions 110, especially if oriented with their long axes generally, e.g. strictly, aligned with the longitudinal axis of backing 2, would resist both tearing and stretching and thus would interfere with both abilities. Thus, the ability of backing 2 bearing microstructured paint-retention pattern 103 upon it, to both be at least generally transversely hand-torn, and to be transversely curved, represent unexpected results, evidenced by the tape sample shown in FIG. 22 which has been both extensively transversely curved and at least generally transversely hand-torn (in this particular case, in strict alignment with the transverse axis of the tape) at edges 13.

Tape 1 as disclosed herein comprises an additional advantage of being resistant to slivering, e.g. in comparison to conventional paper-based masking tapes. Additionally, tape 1 as disclosed herein may comprise yet another advantage in being less susceptible to undesirable effects of humidity, e.g. in comparison to conventional paper-based masking tapes. Still further additionally, tape 1 as disclosed herein may comprise an enhanced ability to conform to and bond to rough or uneven surfaces, and may provide good paint lines even upon such surfaces.

As mentioned above, tapes bearing a microstructured paint-retention pattern 103, comprising partitions 102 that define microreceptacles 101, have been unexpectedly found to be able to capture and retain large quantities of liquid paint, and to exhibit an enhanced ability to resist flaking off of the dried paint. Accordingly, in certain embodiments of the invention, herein is disclosed a method of painting a first surface portion while masking a second surface portion so that it is not painted, the method comprising: adhesively attaching a length of plastic tape to the second surface portion, the plastic tape comprising a backing comprising a longitudinal axis and a transverse width and axis, and comprising a first major side and an oppositely-facing second major side, wherein the first major side of the backing comprises a microstructured paint-retention pattern, wherein a pressure-sensitive adhesive is disposed on the second major side of the backing, and wherein the backing and the microstructured paint-retention pattern constitute a monolithic plastic unit; and, applying liquid paint to at least the first surface portion. In such embodiments, a hand-tear pattern need not necessarily be present (e.g., on the second major side of the backing). In such cases, the major surface of the second major side of the backing may be e.g. generally flat.

Although discussed herein primarily in the context of being used for masking applications e.g. in connection with painting, those of ordinary skill will appreciate that tape 1 as disclosed herein may find use in other applications as well. It will however be evident to those ordinary skill that, in any application, tape 1 as it will be used by an end user will comprise backing 2 with pressure-sensitive adhesive 300 thereupon, therefore backing 2 is different from, and cannot be equated with, any kind of liner, release liner, protective film or the like, that is removed from contact with an adhesive layer and discarded before the actual end use of the adhesive.

List of Exemplary Embodiments

Embodiment 1. A hand-tearable plastic tape, comprising; a backing comprising a longitudinal axis and a transverse width and axis, and comprising a first major side and an oppositely-facing second major side, wherein the first major side of the backing comprises a microstructured paint-retention pattern comprising microreceptacles that are at least partially defined by a multiplicity of first microstructured partitions and a multiplicity of second microstructured partitions at least some of which intersect with first microstructured partitions to define microreceptacles thereby; wherein the second major side of the backing comprises a microstructured hand-tear pattern comprising a multiplicity of lines of weakness at least some of which comprise a long axis that is oriented at least generally transversely to the backing; wherein a pressure-sensitive adhesive is disposed on the second major side of the backing; and wherein the backing, the microstructured paint-retention pattern and the microstructured hand-tear pattern all constitute a monolithic plastic unit.

Embodiment 2. The tape of embodiment 1 wherein at least some of the lines of weakness are continuous lines of weakness each comprising a continuous groove that extends across the entire transverse width of the second side of the backing.

Embodiment 3. The tape of embodiment 2 wherein at least some of the continuous lines of weakness comprise a long axis that is oriented within plus or minus 5 degrees of the transverse axis of the backing.

Embodiment 4. The tape of any of embodiments 2-3 wherein the continuous grooves comprise an elongate length and a width and wherein at least some of the grooves comprise bridging structures that are integrally molded with the backing and that are spaced along the elongate length of the groove, with each bridging structure extending across at least a portion of the width of the groove in a direction generally aligned with the longitudinal axis of the backing.

Embodiment 5. The tape of any of embodiments 1-4 wherein at least some of the lines of weakness are continuous lines of weakness each comprising a continuous elongate valley that extends across the entire transverse width of the second side of the backing, and wherein elongate ridges that extend across the transverse width of the second side of the backing are interspersed between at least some of the elongated valleys along the longitudinal length of the backing.

Embodiment 6. The tape of embodiment 1 wherein at least some of the lines of weakness are discontinuous lines of weakness, each discontinuous line of weakness being collectively defined by a multiplicity of recesses in a second major surface of the second major side of the backing.

Embodiment 7. The tape of embodiment 6 wherein at least some of the discontinuous lines of weakness extend across the entire transverse width of the second side of the backing and comprise a long axis that is oriented within plus or minus 5 degrees of the transverse axis of the backing.

Embodiment 8. The tape of any of embodiments 1-7 where the paint-retention pattern comprises a multiplicity of microreceptacles each comprising an average area of from about 10,000 to about 100,000 square microns, and wherein at least some of the first and second microstructured partitions comprise a height of from about 40 μm to about 80 μm.

Embodiment 9. The tape of any of embodiments 1-8 wherein at least some of the second microstructured partitions comprise a long axis that is oriented within plus or minus about 20 degrees of the long axis of at least some of the lines of weakness.

Embodiment 10. The tape of any of embodiments 1-9 wherein at least some of the second microstructured partitions comprise a long axis that is oriented at least generally transversely to the backing.

Embodiment 11. The tape of any of embodiments 1-10 wherein at least some of the second microstructured partitions comprise a long axis that is oriented within plus or minus 5 degrees of the transverse axis of the backing and within plus or minus 5 degrees of the long axis of at least some of the lines of weakness.

Embodiment 12. The tape of any of embodiments 1-11 wherein at least some of the first microstructured partitions comprise a long axis that is generally longitudinally aligned with the longitudinal axis of backing.

Embodiment 13. The tape of any of embodiments 1-12 wherein the first microstructured partitions each comprise a long axis that is oriented within plus or minus about 5 degrees of the longitudinal axis of backing, wherein the second microstructured partitions each comprise a long axis that is oriented within plus or minus 5 degrees of the transverse axis of the backing and within plus or minus 5 degrees of the long axis of each of the lines of weakness, and wherein the long axis of each of the lines of weakness is oriented within plus or minus 5 degrees of the transverse axis of the backing.

Embodiment 14. The tape of any of embodiments 1-13 wherein at least some of the first microstructured partitions comprise first elongate ribs and wherein at least some of the second microstructured partitions comprise second elongate ribs.

Embodiment 15. The tape of embodiment 14 wherein each second elongate rib comprises a height that is generally uniform along the elongate length of the second elongate rib.

Embodiment 16. The tape of any of embodiments 14-15 wherein the first elongate ribs comprise a height that is the same as the height of the second elongate ribs and wherein the height of each first elongate rib is generally uniform along the elongate length of the first elongate rib.

Embodiment 17. The tape of embodiment 14 wherein at least some portions of some of the first elongate ribs comprise a height that is between about 40% and about 80% of the height of the second elongate ribs.

Embodiment 18. The tape of embodiment 17 wherein the height of each first elongate rib is generally uniform along the elongate length of the first elongate rib.

Embodiment 19. The tape of any of embodiments 14, 15 or 17 wherein at least some of the first elongate ribs comprise, at locations in between intersections of the first elongate ribs with the second elongate ribs, one or more notches.

Embodiment 20. The tape of any of embodiments 1-13 wherein at least some of the first microstructured partitions are discontinuous partitions each comprising a series of rib segments or a series of posts.

Embodiment 21. The tape of any of embodiments 1-20 wherein the plastic material contains, less any mineral fillers present, at least about 95 wt. % of polyethylene homopolymers that consist essentially of a blend of low density polyethylene and high density polyethylene, at a blend ratio of from about 60:40 to about 40:60 by weight.

Embodiment 22. The tape of any of embodiments 1-21 wherein the pressure sensitive adhesive is chosen from the group consisting of (meth)acrylate adhesives, natural rubber adhesives, synthetic rubber adhesives, silicone adhesives, and block copolymer adhesives.

Embodiment 23. The tape of any of embodiments 1-22 wherein the tape comprises an elongate length in the form of a self-wound roll in which a major surface of the pressure-sensitive adhesive is in releasable contact with at least portions of the microstructured first and/or second partitions of the first major side of the tape.

Embodiment 24. The tape of any of embodiments 1-23 wherein the hand-tearable plastic tape is transversely curvable into an arcuate shape.

Embodiment 25. A method of painting a first surface portion while masking a second surface portion so that it is not painted, the method comprising: adhesively attaching a length of hand-tearable plastic tape to the second surface portion, the hand-tearable plastic tape comprising a backing comprising a longitudinal axis and a transverse width and axis, and comprising a first major side and an oppositely-facing second major side, wherein the first major side of the backing comprises a microstructured paint-retention pattern, wherein the second major side of the backing comprises a microstructured hand-tear pattern, wherein a pressure-sensitive adhesive is disposed on the second major side of the backing, and wherein the backing, the microstructured paint-retention pattern and the microstructured hand-tear pattern all constitute a monolithic plastic unit; and, applying liquid paint to at least the first surface portion.

Embodiment 26. The method of embodiment 25 wherein the liquid paint is applied by a brush, roller or sprayer.

Embodiment 27. The method of any of embodiments 25-26 wherein the paint is a latex paint with a viscosity of at least 100 cps at 21 degrees C.

Embodiment 28. The method of any of embodiments 25-27 wherein the length of hand-tearable plastic tape is hand-torn from a roll of hand-tearable plastic tape prior to being adhesively attached to the second surface portion.

Embodiment 29. The method of any of embodiments 25-28 comprising the further step of, after applying the liquid paint to at least the first surface portion, removing the length of tape from the second surface portion.

Embodiment 30. The method of any of embodiments 25-29 wherein the method comprises transversely curving at least a portion of the length of hand-tearable plastic tape to match an arcuate shape of the second surface portion and adhesively attaching the transversely curved length of tape to the arcuate-shaped second surface portion.

Embodiment 31. A method of making a hand-tearable plastic tape comprising a backing with a first major side with a microstructured paint-retention pattern, and a second, oppositely-facing major side with a microstructured hand-tear pattern, the method comprising: contacting a first major surface of a molten polymeric extrudate with a first tooling surface that comprises a negative of the microstructured paint-retention pattern, and contacting a second major surface of the molten polymeric extrudate with a second tooling surface that comprises a negative of the microstructured hand-tear pattern, so that the first major surface of the extrudate is molded against the first tool and the second major surface of the extrudate is molded against the second tool, so as to form a backing with a microstructured paint-retention pattern on the first major side of the backing and a microstructured hand-tear pattern on the second major side of the backing; and, disposing a pressure-sensitive adhesive on the second major side of the backing.

Embodiment 32. The method of embodiment 31 wherein the first and second tooling surfaces comprise generally oppositely-facing surface portions of first and second tool rolls, or generally oppositely-facing surface portions of first and second tool belts, and wherein the method comprises feeding molten polymeric extrudate into a gap between the generally oppositely-facing first and second tooling surface so that the first major surface of the molten polymeric extrudate is molded against the first tooling surface at the same time that the second major surface of the molten polymeric extrudate is molded against the second tooling surface, so as to form an elongate length of backing, and disposing the pressure-sensitive adhesive on the second major side of the elongate length of backing to form an elongate length of hand-tearable tape.

Embodiment 33. The method of any of embodiments 31-32 wherein the hand-tear pattern comprises a multiplicity of lines of weakness provided by one or more recesses in the second major surface of the second major side of the backing and that each comprises a depth, and wherein disposing of the pressure-sensitive adhesive on the second major side of the elongate length of backing is performed by coating a pressure-sensitive adhesive precursor onto the second major surface of the elongate length of backing and then transforming the precursor into the pressure-sensitive adhesive so that the pressure-sensitive adhesive fills the recesses and is adhesively bonded to surfaces thereof.

Embodiment 34. The method of any of embodiments 31-33 further comprising the step of self-winding the elongate length of hand-tearable tape to form a self-wound roll in which a major surface of the pressure-sensitive adhesive is in releasable contact with at least portions of microstructured partitions defining the paint-retention pattern of the first major side of the tape.

Embodiment 35. The method of any of embodiments 31-34 wherein the molten polymeric extrudate consists essentially of, less any mineral fillers present, a blend of high density polyethylene and low density polyethylene at a ratio of from about 60:40 to about 40:60 by weight.

Embodiment 36. A method of painting a first surface portion while masking a second surface portion so that it is not painted, the method comprising: adhesively attaching a length of plastic tape to the second surface portion, the plastic tape comprising a backing comprising a longitudinal axis and a transverse width and axis, and comprising a first major side and an oppositely-facing second major side, wherein the first major side of the backing comprises a microstructured paint-retention pattern, wherein a pressure-sensitive adhesive is disposed on the second major side of the backing, and wherein the backing and the microstructured paint-retention pattern constitute a monolithic plastic unit; and, applying liquid paint to at least the first surface portion.

Embodiment 37. The method of embodiment 36, wherein the method uses a tape comprising any of embodiments 8, 10, 12, and 14-24.

Embodiment 37. The method of any of embodiments 25-30, wherein the method uses a tape comprising any of embodiments 1-24.

EXAMPLES

Production of Tape Backings —Representative Working Example

Apparatus

Extrusion and molding of tape backings were performed using a process line of the general type shown in FIG. 21. A first metal tooling roll was obtained with an approximately 12 inch (30.5 cm) diameter and an approximately 16 inch (40.6 cm) total face width. Of this total face width, the central 12 inches was divided into three 4-inch (10.2 cm) wide lateral zones each bearing the negative of a slightly different paint-retention pattern. Each of the three zones comprised (via diamond turning) first and second sets of parallel major grooves, with each major groove of the first set running circumferentially around the tooling roll and each major groove of the second set running transversely across the face of the tooling roll (in that zone). The first and second major grooves were tapered with flat sidewalls comprising an included angle of approximately 15 degrees, with the groove floor (i.e. the deepest point thereof) being flat with a width of approximately 10 microns and being at a depth of approximately 80 microns below the plano surface of the tooling roll. The only difference between the three zones was that in the center zone the major grooves of each set had a center-to-center spacing of approximately 153 µm, in one of the laterally-outer zones the major grooves had a spacing of approximately 191 µm, and in the other laterally-outer zone the major grooves had a spacing of approximately 127 µm.

All three zones further comprised a set of secondary grooves that were all parallel to each other and were all oriented circumferentially around the tooling roll (i.e., aligned with the first set of major grooves). The secondary grooves all had a depth of approximately 10 microns below the plano surface of the tooling roll, and were tapered with flat sidewalls comprising an included angle of approximately 30 degrees, with the groove floor being flat with a width of approximately 10 microns. The secondary grooves were at a center-to-center spacing of approximately 25 microns.

A second metal tooling roll was obtained with an approximately 12 inch (30.5 cm) diameter and an approximately 16 inch (40.6 cm) total face width. On the patterned portion of the roll face were provided (by diamond turning) a multiplicity of parallel protruding ridges that each ran transversely across the face of the roll, and that were spaced around the circumference of the roll. Each ridge comprised a peak that was 33 microns above the plano surface of the second tooling roll. Each ridge comprised flat sidewalls that were at an angle of approximately 130 degrees relative to each other. The base of each ridge (adjacent the plano surface of the tooling roll) was approximately 140 microns wide. The ridges were circumferentially spaced around the second tooling roll at a center-to-center distance of approximately 940 microns. Each ridge comprised a set of secondary notches each comprising two flat surfaces intersecting to form a linear valley running transversely across a portion of the width of the ridge (i.e., oriented circumferentially around the face of the second tooling roll). Each linear valley was approximately 24 microns below the ridge peak (and thus approximately 9 microns above the plano surface of the tooling roll). The two flat surfaces of each secondary notch were at an angle of approximately 124 degrees relative to each other. The secondary notches were spaced at intervals of approximately 340 microns along each ridge.

Materials and Process

An extrudable composition was obtained comprising approximately 48.5 wt. % low density polyethylene (LDPE) with a density of 0.918 g/cm$^3$ and a Melt Flow Index of 12, obtained from Dow Plastics under the trade designation 4012, and approximately 48.5 wt. % high density polyethylene (HDPE) with a density of 0.965 g/cm$^3$ and a Melt Flow Index of 8.3, obtained from Dow Plastics under the trade designation 8007, along with approximately 3 wt. % blue colorant concentrate (with the polymeric carrier resin of the concentrate not being recorded but believed to be a polyethylene material). The materials were obtained in the form of dry pellets and were dry blended and fed into a 2.5 inch (6.4 cm) diameter single screw extruder and extruded through a 12 inch (30.5 cm) wide cast film die containing a nominal 20 mil (508 µm) gap (subject to adjustment as necessary to optimize the cross-web caliper of the produced web). The die temperature was set at approximately 218 degrees C. and the molten extrudate was extruded at a melt pressure of approximately 1525 psi (10500 kPa). The extrudate was extruded and processed at a linespeed of approximately 15.2 meters per minute.

The first and second tooling rolls were brought together to form a nip under pressure in the range of approximately 100 pli (pounds per linear inch width; 175 N per linear cm width).

Both tooling rolls (which comprised double-spiral shell construction) were temperature-controlled via internally circulated water to maintain a nominal temperature of approximately 66 degrees C. The molten extrudate passed through the nip between the tooling rolls so that, on the first major side of the molten extrudate stream, the molten extrudate flowed into the first and second sets of major grooves in the first tooling roll to form (after solidification) first and second sets of elongated ribs of the general type described earlier herein. The ribs of the first set were oriented along the longitudinal axis of the thus-formed backing and the ribs of the second set were oriented along the transverse axis of the backing. On the second major side of the molten extrudate stream, the molten extrudate flowed over and around the protruding ridges of the second tooling roll to form (after solidification) grooves that were oriented transversely across the width of the thus-formed backing. The molten extrudate flowed into the secondary notches in the ridges so as to form ridged bridging structures of the general type shown in FIGS. 8 and 9 herein.

The extrudate was maintained in contact with the second tooling roll for a wrap angle of approximately 135 degrees, at which point the solidified backing was detached from the tooling roll and passed over a takeoff roll in the general manner shown in FIG. 21. The solidified backing could then be wrapped into a roll. The total thickness of the thus-formed backing was typically in the range of 120 microns (including the height of the partitions (rib) of the paint-retention pattern of the first side of the backing). Under the particular processing conditions listed above, the molten extrudate did not completely penetrate into the (80 µm depth) major grooves all the way to the floor of the grooves. Rather, the penetration was such that the first side of the backing comprised a first set of partitions (elongated ribs), oriented along the longitudinal axis of the backing, which exhibited relatively smoothly varying profiles of the general type exhibited by ribs 120 of FIG. 15. The height of the first ribs in locations in between intersections of the first ribs with the second ribs was estimated to be in the range of approximately 31 microns. Likewise, the backing comprised a second set of partitions (elongated ribs), oriented transversely across the width of the backing, which likewise exhibited relatively smoothly varying profiles, with the height of the second ribs in locations in between intersections of the second ribs with the first ribs being estimated to be in the range of approximately 45 microns. The rib height at the intersections of the first and second ribs was estimated to be in the range of approximately 58 microns.

The second side of the backing comprised continuous lines of weakness (grooves) which were oriented approximately transversely across the width of the backing and were approximately 33 microns deep and approximately 140 microns wide (at the plano surface of the second side of the backing).

Variations

Numerous variations of the above Representative Example were carried out, over a wide range of process line conditions, resin compositions, and the like. In some experiments, the ratio of LDPE to HDPE was varied over the range of approximately 10:90 to 90:10. In some experiments, blends of polyethylene and propylene were used. In some experiments, various fillers (e.g., talc, silica, calcium carbonate, etc.) were included in the composition. In some experiments, the temperature of the tooling rolls was varied over the range of approximately 38 C to 93 C.

Production of Tapes

Various backings were produced in the general manner described above and pressure-sensitive adhesives were then provided on the second major side (containing the hand tear pattern) thereof. It was often convenient to slit the backing into separate rolls, each comprising one of the three above-described paint retention patterns, prior to deposition of the adhesive. Typically, the second major surface of the backing (whether before or after slitting of the roll) was corona-treated (by conventional methods as will be familiar to those of ordinary skill) prior to providing the adhesive thereon. In various experiments, pressure-sensitive adhesives were provided on the second major side of the backing by depositing, e.g. coating, a pressure-sensitive precursor onto the surface of the backing and transforming the precursor into a pressure-sensitive adhesive. In various experiments, this was achieved by coating an adhesive precursor solution and drying off the coating solvent, by coating an adhesive precursor waterborne mixture and drying off the water, by deposition of a hot melt adhesive precursor and solidifying the precursor, and the like. It was often found convenient to deposit the adhesive in such a way, and at such thickness, that it filled the grooves on the second major surface of the backing, in such manner that little or no corresponding depression in the outwardmost surface of the pressure sensitive adhesive was present in the areas overlying the grooves.

In these experiments, tapes comprising numerous types of pressure-sensitive adhesives were produced, including acrylate based adhesives, rubber based adhesives, silicone based adhesives, block copolymer based adhesives, and so on. Typically, the tapes including adhesive thereon were self-wound (without a release liner), and the tapes could then be satisfactorily unwound, as evidenced by the data presented later herein.

Test for Liquid Paint Holding Capability

Working Example

A plastic backing sample was generated with a paint-retention pattern of the general type described in the Representative Working Example above and of the composition described therein, with the elongated ribs of the paint-retention pattern comprising a spacing of approximately 153 microns.

Comparative Examples

A first comparative sample was obtained comprising a conventional high density polyethylene plastic film that was not microstructured and that comprised a smooth surface. A second comparative sample was obtained comprising a blue masking paper of the type used in the conventional paper masking tape product available from 3M Company under the trade designation SCOTCH-BLUE 2090.

Procedure and Results

Approximately 5 grams of Sherwin-Williams A-100 outdoor acrylic paint, at ambient temperature, were poured onto the surface of each film sample. Using a new brush for each film sample, the applied paint was brushed, using one side of the brush only, until no more paint would spread across the sample surface or from the brush. The 5 grams of paint on the plastic film comprising the paint-retention pattern spread to cover 70 square inches (452 cm$^2$). The 5 grams of paint on the non-microstructured plastic film spread to cover 144 square inches 929 cm$^2$). The 5 grams of paint on the blue masking paper spread to cover 104 square inches 671 cm$^2$). The approximate liquid paint holding ability per area of film, for each sample, could then be calculated in grams per square foot (per 0.093 square meter) as shown in Table 1

TABLE 1

| Sample | Liquid paint holding ability (g/ft$^2$) |
|---|---|
| Plastic film with paint-retention pattern | 10.3 |
| Non-microstructured plastic film | 5.0 |
| Blue masking tape paper | 6.9 |

Although only semi-quantitative, the test was indicative that the plastic film with the microstructured paint-retention pattern was able to receive and retain more liquid paint per area, than either the unstructured HDPE plastic film or the blue masking paper.

Test for Dried Paint Anchorage Capability

Working Examples

Polymeric backings were obtained of a similar type as the Representative Working Example, with differences as noted below. The first side of the backing comprised a paint-retention pattern comprising first and second orthogonally-oriented sets of partitions, with each set of partitions comprising parallel, continuous elongate ribs. The spacing between the ribs of each set was approximately 250 microns. The rib height for each set was not recorded. The first and second orthogonally-oriented rib sets were each oriented at approximately a 45 degree angle to the longitudinal axis of the polymeric backing (in contrast to the Representative Working Example, in which one set was aligned with the longitudinal axis of the backing and one set was orthogonal thereto). The paint-retention pattern further comprised secondary riblets of the general type described in the Representative Working Example, of height approximately 10 microns, and oriented at approximately a 45 degree angle to the ribs of the first and second sets. The backings did not comprise a hand-tear pattern, nor a pressure-sensitive adhesive, on the second side of the backing. The backing was comprised of polypropylene.

Various liquid paints were brushed onto the first side of backing samples and allowed to dry for at least approximately 48 hours at approximately 32 degrees C. After drying, a 4.5 kg soft-surfaced roller was used to adhere 3M #2090 Masking Tape on top of the painted samples. The masking tape samples were allowed to sit for at least approximately 24 hours. The masking tape samples were then manually peeled from the film samples and the amount of dried paint that remained anchored on the film (as opposed to being peeled off by the masking tape) was visually inspected. Film samples were tested in which the first side (bearing the paint-retention pattern) had received various surface treatments: none, corona treatment, corona plus coating of a low adhesion backsize (believed to be representative of commonly used low adhesive backsizes), and corona plus a primer coating (believed to be representative of commonly used primer coatings). Various paints were evaluated, including several latex paints, latex primer, oil-based primer, semitransparent latex stain, solid color latex stain, and oil-based stain. Excellent anchorage of the dried paint on the paint-retention pattern was observed in generally all cases, with little or no dried paint transferring to the #2090 masking tape or being removed from the paint-retention pattern upon peeling of the #2090 masking tape.

Test for Unwind Force of Rolls of Tape

Working Examples

Polymeric films of a similar type and composition as that described in the Test for Dried Paint Anchorage Capability were obtained. On their first side the films had a paint-retention pattern comprising first and second sets of partitions comprising elongate ribs of generally similar type to those described in the Representative Working Example. Two types of film were obtained, one with each set of elongate ribs being at a spacing of approximately 250 microns and one with each set of elongate ribs being at a spacing of approximately 125 microns. The partition height was not recorded. The first and second partitions sets were orthogonal to each other and were each oriented at approximately a 45 degree angle to the long axis of the polymeric film (i.e., the partitions were of similar pattern to that of the films used in the above Test for Dried Paint Anchorage Capability). The paint-retention pattern further comprised secondary riblets of the general type described in the Representative Working Example, of height approximately 10 microns, and oriented at approximately a 45 degree angle to the ribs of the first and second sets The films did not comprise a hand-tear pattern on the second side of the film.

Two pressure-sensitive adhesive precursor coating mixtures were obtained. The first was a water based adhesive coating mixture comprising a first blend of acrylate polymers and Kraton block copolymers (available from the Kraton Performance Polymers, Inc., Houston, Tex.). The second was a hot melt coating mixture comprising a second blend of acrylate polymers and Kraton block copolymers. Both of these comprised adhesive precursor compositions of the general type commonly known to those of skill in the art, with the second adhesive precursor being chosen so as to provide a more aggressive pressure-sensitive adhesive (i.e., with higher tack and bond) than the first. The coating mixtures were coated onto the second side (i.e., the flat surface without a hand-tear pattern) of the polymeric films using conventional coating methods so as to provide pressure-sensitive adhesives thereon. The polymeric films with pressure-sensitive adhesives thereon were then wound into self-wound rolls (without any release liner being used) so that the outer surface of the pressure-sensitive adhesive was in contact with outwardmost surfaces of the partitions of the paint-retention patterns.

The force to unwind layers of tape from rolls was evaluated by attaching a tape roll to a spool fixture of a slip/peel tester (Model 3M90, IMASS Inc., Hingham, Mass.) and the force required to unwind the tape from the tape roll was measured at a peel rate of 90 inches/minute (229 cm/min) at a 180 (degree) angle with respect to the tape roll. The average force over a run time of approximately 5 seconds was measured, and was reported as ounces of force per inch (width) of tape (0.11 N per cm width of tape). Unwind forces were measured immediately (e.g., within a few hours) after coating, and again after approximately 12 weeks aging at approximately 21 C and approximately 50% relative humidity. The results are shown in Table 2.

TABLE 2

| | | Unwind Force (oz/in) | |
|---|---|---|---|
| Pattern | Adhesive | No aging | 12 weeks aging |
| 125 μm spacing | Less aggressive | 4.98 | 16.2 |
| 125 μm spacing | More aggressive | 25.6 | 40.9 |
| 250 μm spacing | Less aggressive | 3.1 | 4.9 |
| 250 μm spacing | More aggressive | 9.31 | 15.7 |

Test for Ability to Hand-Tear and Transversely Curve Tape

Working Examples

Numerous samples of tape, e.g. of the general type exemplified in the Representative Working Example, were produced comprising a paint-retention pattern on the first side and a hand-tear pattern and a pressure-sensitive adhesive on the second side. Many such tapes could be satisfactorily hand-torn across the width of the tape, e.g. as evidenced by hand-torn edges 13 shown in FIG. 22. In addition, many such tapes could be satisfactorily transversely curved, e.g. as evidenced by the manually transversely curved section of tape shown in FIG. 22.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A hand-tearable plastic tape, comprising;
a backing comprising a longitudinal axis and a transverse width and axis, and comprising a first major side and an oppositely-facing second major side,
wherein the first major side of the backing comprises a microstructured paint-retention pattern comprising microreceptacles that are at least partially defined by a multiplicity of first microstructured partitions and a multiplicity of second microstructured partitions at least some of which intersect with first microstructured partitions to define microreceptacles thereby, and wherein at least some of the first microstructured partitions comprise first elongate ribs with a long axis that is at least generally longitudinally aligned with the longitudinal axis of the backing;
wherein the second major side of the backing comprises a microstructured hand-tear pattern comprising a multiplicity of lines of weakness at least some of which comprise a long axis that is oriented at least generally transversely to the backing;
wherein a pressure-sensitive adhesive is disposed on the second major side of the backing;
wherein the backing, the microstructured paint-retention pattern and the microstructured hand-tear pattern all constitute a monolithic plastic unit;
and wherein the hand-tearable plastic tape is transversely curvable into an arcuate shape.

2. The tape of claim 1 wherein at least some of the lines of weakness are continuous lines of weakness each comprising a continuous groove that extends across the entire transverse width of the second side of the backing.

3. The tape of claim 2 wherein at least some of the continuous lines of weakness comprise a long axis that is oriented within plus or minus 5 degrees of the transverse axis of the backing.

4. The tape of claim 2 wherein the continuous grooves comprise an elongate length and a width and wherein at least some of the grooves comprise bridging structures that are integrally molded with the backing and that are spaced along the elongate length of the groove, with each bridging structure extending across at least a portion of the width of the groove in a direction generally aligned with the longitudinal axis of the backing.

5. The tape of claim 1 wherein at least some of the lines of weakness are continuous lines of weakness each comprising a continuous elongate valley that extends across the entire transverse width of the second side of the backing, and wherein elongate ridges that extend across the transverse width of the second side of the backing are interspersed between at least some of the elongated valleys along the longitudinal length of the backing.

6. The tape of claim 1 wherein at least some of the lines of weakness are discontinuous lines of weakness, each discontinuous line of weakness being collectively defined by a multiplicity of recesses in a second major surface of the second major side of the backing.

7. The tape of claim 6 wherein at least some of the discontinuous lines of weakness extend across the entire transverse width of the second side of the backing and comprise a long axis that is oriented within plus or minus 5 degrees of the transverse axis of the backing.

8. The tape of claim 1 where the paint-retention pattern comprises a multiplicity of microreceptacles each comprising an average area of from about 10,000 to about 100,000 square microns, and wherein at least some of the first and second microstructured partitions comprise a height of from about 40 µm to about 80 µm.

9. The tape of claim 1 wherein at least some of the second microstructured partitions comprise a long axis that is oriented within plus or minus about 20 degrees of the long axis of at least some of the lines of weakness.

10. The tape of claim 9 wherein at least some of the second microstructured partitions comprise a long axis that is oriented at least generally transversely to the backing.

11. The tape of claim 10 wherein at least some of the second microstructured partitions comprise a long axis that is oriented within plus or minus 5 degrees of the transverse axis of the backing and within plus or minus 5 degrees of the long axis of at least some of the lines of weakness.

12. The tape of claim 11 wherein the first microstructured partitions each comprise a long axis that is oriented within plus or minus about 5 degrees of the longitudinal axis of backing, wherein the second microstructured partitions each comprise a long axis that is oriented within plus or minus 5 degrees of the transverse axis of the backing and within plus or minus 5 degrees of the long axis of each of the lines of weakness, and wherein the long axis of each of the lines of weakness is oriented within plus or minus 5 degrees of the transverse axis of the backing.

13. The tape of claim 1 wherein at least some of the second microstructured partitions comprise second elongate ribs.

14. The tape of claim 13 wherein each second elongate rib comprises a height that is generally uniform along the elongate length of the second elongate rib.

15. The tape of claim 14 wherein the first elongate ribs comprise a height that is the same as the height of the second elongate ribs and wherein the height of each first elongate rib is generally uniform along the elongate length of the first elongate rib.

16. The tape of claim 14 wherein at least some portions of some of the first elongate ribs comprise a height that is between about 40% and about 80% of the height of the second elongate ribs.

17. The tape of claim 16 wherein the height of each first elongate rib is generally uniform along the elongate length of the first elongate rib.

18. The tape of claim 16 wherein at least some of the first elongate ribs comprise, at locations in between intersections of the first elongate ribs with the second elongate ribs, one or more notches.

19. The tape of claim 1 wherein at least some of the first microstructured partitions are discontinuous partitions each comprising a series of rib segments or a series of posts.

20. The tape of claim 1 wherein the plastic material contains, less any mineral fillers present, at least about 95 wt. % of polyethylene homopolymers that consist essentially of a blend of low density polyethylene and high density polyethylene, at a blend ratio of from about 60:40 to about 40:60 by weight.

21. The tape of claim 1 wherein the pressure sensitive adhesive is chosen from the group consisting of (meth)acrylate adhesives, natural rubber adhesives, synthetic rubber adhesives, silicone adhesives, and block copolymer adhesives.

22. The tape of claim 1 wherein the tape comprises an elongate length in the form of a self-wound roll in which a major surface of the pressure-sensitive adhesive is in releasable contact with at least portions of the microstructured first and/or second partitions of the first major side of the tape.

23. The tape of claim 1 wherein the backing is a cast film that consists of a molten extrudate that was contacted with a first tooling surface so as to impart the microstructured paint-retention pattern to the first major side of the backing and with a second tooling surface so as to impart the microstructured hand-tear pattern to the second major side of the backing, and was solidified while in contact with at least one of the first and second tooling surfaces.

* * * * *